(12) United States Patent
Lev

(10) Patent No.: US 12,002,270 B2
(45) Date of Patent: Jun. 4, 2024

(54) ENHANCED DETECTION USING SPECIAL ROAD COLORING

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 387 days.

(21) Appl. No.: 17/372,659

(22) Filed: Jul. 12, 2021

(65) Prior Publication Data

US 2022/0284226 A1    Sep. 8, 2022

Related U.S. Application Data

(63) Continuation-in-part of application No. 17/327,973, filed on May 24, 2021, now Pat. No. 11,900,695, which is a continuation-in-part of application No. 17/313,161, filed on May 6, 2021, now Pat. No. 11,881,033, which is a continuation-in-part of
(Continued)

(51) Int. Cl.
| | |
|---|---|
| G06V 20/56 | (2022.01) |
| E01C 23/16 | (2006.01) |
| G06T 7/11 | (2017.01) |
| G06V 20/58 | (2022.01) |

(Continued)

(52) U.S. Cl.
CPC ............ G06V 20/588 (2022.01); E01C 23/16 (2013.01); G06T 7/11 (2017.01); G06V 20/58 (2022.01); H04N 23/11 (2023.01); *G06T 2207/30256* (2013.01); *G06V 40/103* (2022.01)

(58) Field of Classification Search
CPC ......... H06T 7/0006; H06T 2207/30256; G06T 7/0004; G06T 2207/10004; G06T 7/12; G06V 20/20; G06V 20/588; G08G 1/167
See application file for complete search history.

(56) References Cited

U.S. PATENT DOCUMENTS

| | | |
|---|---|---|
| 4,219,092 A | 8/1980 | Richter |
| 4,690,553 A | 9/1987 | Fukamizu et al. |
| | (Continued) | |

OTHER PUBLICATIONS

Notice of Allowance dated Sep. 20, 2023 from the US Patent and Trademark Office Re. U.S. Appl. No. 17/313,161. (13 pages).
(Continued)

*Primary Examiner* — Yosef Kassa

(57) ABSTRACT

Disclosed herein are methods and systems for detecting dynamic objects using road painted patterns perceptible in infrared spectral range, comprising receiving images captured in one or more infrared spectral ranges depicting a road segment painted with background patterns which are highly imperceptible in visible light spectrum while highly visible in one or more infrared spectral ranges, analyzing the images to detecting one or more dynamic objects located in front of the background patterns. The light reflected by the one or more dynamic objects in the one or more infrared spectral ranges deviating from the light reflected by the one or more background pattern and computing a location of the one or more identified objects. Further disclosed are methods and systems for calibration of systems and/or sensors based on reference markings which are highly imperceptible in visible light spectrum while highly visible in the infrared spectral range(s).

18 Claims, 14 Drawing Sheets

Related U.S. Application Data application No. 17/191,793, filed on Mar. 4, 2021, application No. 17/372,659, filed on Mar. 4, 2021 is a continuation-in-part of application No. 17/191,793, filed on Mar. 4, 2021.

(51) Int. Cl.
*H04N 23/11* (2023.01)
*G06V 40/10* (2022.01)

(56) References Cited

U.S. PATENT DOCUMENTS

| | | | |
|---|---|---|---|
| 5,203,923 | A | 4/1993 | Hartman |
| 5,296,256 | A | 3/1994 | Hartman |
| 5,599,133 | A | 2/1997 | Costello et al. |
| 6,074,693 | A | 6/2000 | Manning |
| 6,288,901 | B1 * | 9/2001 | Liu .................. G06F 1/188 361/679.6 |
| 6,398,369 | B1 * | 6/2002 | Starling ............ E01F 9/512 359/534 |
| 6,498,570 | B2 | 12/2002 | Ross |
| 6,519,884 | B1 * | 2/2003 | Duhamel ............ G09F 7/00 40/607.01 |
| 6,729,706 | B1 | 5/2004 | Patton et al. |
| 6,741,186 | B2 * | 5/2004 | Ross ................ G01S 7/4818 250/397 |
| 6,774,988 | B2 | 8/2004 | Stam et al. |
| 6,827,522 | B2 * | 12/2004 | Kodama ............ G08G 1/162 404/72 |
| 6,887,011 | B2 * | 5/2005 | Snagel ............ E01F 9/553 359/551 |
| 6,922,636 | B2 | 7/2005 | Balasubramanian et al. |
| 7,025,527 | B2 | 4/2006 | Mecham |
| 7,348,496 | B2 | 3/2008 | Wermer et al. |
| 7,552,008 | B2 | 6/2009 | Newstrom et al. |
| 7,652,584 | B2 | 6/2010 | Fridthjof |
| 7,755,619 | B2 | 7/2010 | Wang et al. |
| 7,866,917 | B2 | 1/2011 | Malit |
| 8,040,248 | B2 | 10/2011 | Fridthjof |
| 8,208,021 | B2 * | 6/2012 | Unoura ............ G08G 1/167 348/148 |
| 8,503,728 | B2 | 8/2013 | Takahashi |
| 8,537,338 | B1 * | 9/2013 | Medasani .......... G01S 7/4802 382/104 |
| 8,849,508 | B2 | 9/2014 | Ibrahim et al. |
| 8,958,982 | B2 | 2/2015 | Sempuku et al. |
| 9,230,183 | B2 | 1/2016 | Bechtel et al. |
| 9,594,021 | B2 | 3/2017 | Lin et al. |
| 9,721,460 | B2 | 8/2017 | Takemura et al. |
| 9,784,843 | B2 | 10/2017 | Dolinar et al. |
| 10,147,320 | B1 | 12/2018 | Ellis |
| 10,309,788 | B2 | 6/2019 | Davidson |
| 10,635,896 | B2 | 4/2020 | Heimberger et al. |
| 10,921,815 | B2 | 2/2021 | Bell et al. |
| 11,054,538 | B1 | 7/2021 | Mac Vittie et al. |
| 11,300,415 | B2 | 4/2022 | Ishida |
| 2022/0198200 | A1 | 6/2022 | LaPonse |
| 2022/0282436 | A1 | 9/2022 | Lev |
| 2022/0284223 | A1 | 9/2022 | Lev |
| 2022/0284224 | A1 | 9/2022 | Lev |
| 2022/0284225 | A1 | 9/2022 | Lev |

OTHER PUBLICATIONS

Notice of Allowance dated Oct. 4, 2023 from the US Patent and Trademark Office Re. U.S. Appl. No. 17/327,973. (13 pages).
Babic et al. "Application and Characteristics of Waterborne Road Marking Paint", International Journal or Traffic and Transport Engineering, 5(2): 150-169, Jun. 1, 2015.
Smith "Refelective Road Markings Improve Visibility, Safety", Road Markings, Barriers & Workzone Protection, 4 P., Feb. 13, 2012.
Notice of Allowance Dated Mar. 29, 2024 from the US Patent and Trademark Office Re. U.S. Appl. No. 17/577,067. (23 pages).
Official Action Dated Feb. 15, 2024 from the US Patent and Trademark Office Re. U.S. Appl. No. 17/191,793. (29 pages).

\* cited by examiner

ENHANCED DETECTION USING SPECIAL ROAD COLORING

RELATED APPLICATIONS

This application is a Continuation-in-Part (CIP) of U.S. patent application Ser. No. 17/191,793 filed on Mar. 4, 2021.

This application is also a Continuation-in-Part (CIP) of U.S. patent application Ser. No. 17/327,973 filed on May 24, 2021, which is a Continuation-in-Part (CIP) of U.S. patent application Ser. No. 17/313,161 filed on May 6, 2021, which is a Continuation-in-Part (CIP) of U.S. patent application Ser. No. 17/191,793 filed on Mar. 4, 2021.

The contents of the above applications are all incorporated by reference as if fully set forth herein in their entirety.

FIELD AND BACKGROUND OF THE INVENTION

The present invention, in some embodiments thereof, relates to painting road markings to support object detection, and, more specifically, but not exclusively, to painting road markings visible in the infrared spectrum while imperceptible in the human visible light spectrum to support object detection.

Road markings have evolved over the years since the introduction of motorized vehicles and the development of roads infrastructures to host these vehicles in order to assist drivers to grasp and understand their motorized environment and take actions accordingly.

Recent times have witnessed major advancement, evolution and in fact a revolution in the development and deployment of automated systems, for example, traffic monitor and/or control systems, road safety systems and/or the like deployed to monitor transportation traffic whether vehicles or pedestrians in attempt to increase traffic flow efficiency, increase road safety, enforce traffic regulations and/or the like.

Road markings may be deployed to increase the capabilities and/or performance of such traffic monitoring systems, for example, accuracy, reliability, robustness and/or the like.

SUMMARY OF THE INVENTION

According to a first aspect of the present invention there is provided a method of detecting dynamic objects using road painted patterns perceptible in infrared spectral range, comprising using one or more processors for:
  Receiving one or more infrared images depicting, in one or more infrared spectral ranges, one or more surfaces of one or more road segments painted with one or more background patterns using one or more paint materials characterized by: (1) reflecting light in visible light spectral range deviating less than a first value from the light reflected by the one or more surfaces, and (2) reflecting light in the one or more infrared spectral ranges deviating more than a second value from the light reflected by the one or more surfaces.
  Analyzing the one or more infrared images to detecting one or more dynamic objects located in front of one or more of the background patterns. The light reflected by the one or more dynamic objects in the one or more infrared spectral ranges deviating from the light reflected by the one or more background pattern.
  Computing a location of the one or more identified objects.

According to a second aspect of the present invention there is provided a system for detecting dynamic objects using road painted patterns perceptible in infrared spectral range, comprising one or more processors configured to execute a code. The code comprising:
  Code instruction to receive one or more infrared images depicting, in one or more infrared spectral ranges, one or more surfaces of one or more road segments painted with one or more background patterns using one or more paint materials characterized by: (1) reflecting light in visible light spectral range deviating less than a first value from the light reflected by the one or more surfaces, and (2) reflecting light in the one or more infrared spectral ranges deviating more than a second value from the light reflected by the one or more surfaces.
  Code instruction to analyze the one or more infrared images to detecting one or more dynamic objects located in front of one or more of the background patterns. The light reflected by the one or more dynamic objects in the one or more infrared spectral ranges deviating from the light reflected by the one or more background pattern.
  Code instruction to compute a location of the one or more identified objects.

According to a third aspect of the present invention there is provided a method of computing instruction for painting background patterns perceptible in infrared spectral range to support detection of dynamic objects, comprising using one or more processors for:
  Computing instructions for painting one or more background patterns on one or more surfaces of one or more road segments using one or more paint materials characterized by: (1) reflecting light in a visible light spectral range deviating less than a first value from the visible light spectral range reflected by the surface, and (2) reflecting light in one or more infrared spectral ranges deviating more than a second value from the light reflected by the surface.
  Outputting the painting instructions for applying the one or more paint materials on the one or more surfaces according to the instructions such that the one or more background patterns are perceptible in the one or more infrared spectral ranges while significantly imperceptible in the visible spectral range.
Wherein one or more one or more dynamic objects reflecting light in the one or more infrared spectral ranges deviating from the light reflected by the one or more background patterns is detectable when located in front of the one or more background patterns.

According to a fourth aspect of the present invention there is provided a system for computing instruction for painting background patterns perceptible in infrared spectral range to support detection of dynamic objects, comprising one or more processor configured to execute a code, the code comprising:
  Code instruction to compute instructions for painting one or more background patterns on one or more surfaces of one or more road segments using one or more paint materials characterized by: (1) reflecting light in a visible light spectral range deviating less than a first value from the visible light spectral range reflected by the surface, and (2) reflecting light in one or more infrared spectral ranges deviating more than a second value from the light reflected by the surface.
  Code instruction to output the painting instructions for applying the one or more paint materials on the one or more surfaces according to the instructions such that the one or more background patterns are perceptible in the one or more infrared spectral ranges while significantly imperceptible in the visible spectral range.

Wherein one or more one or more dynamic objects reflecting light in the one or more infrared spectral ranges deviating from the light reflected by the one or more background patterns is detectable when located in front of the one or more background patterns.

According to a fifth aspect of the present invention there is provided a background pattern painted on one or more surfaces of one or more road segments using one or more paint materials characterized by: (1) reflecting light in visible light spectral range deviating less than a first value from the light reflected by the one or more surfaces, and (2) reflecting light in one or more infrared spectral ranges deviating more than a second value from the light reflected by the one or more surfaces. Wherein one or more dynamic objects reflecting light in the one or more infrared spectral ranges deviating from the light reflected by the background pattern are detectable when located in front of the background pattern.

According to a sixth aspect of the present invention there is provided a method of calibrating imaging sensors deployed to monitor roads traffic according to infrared visible reference markings, comprising using one or more processors for:

Receiving one or more one or more infrared images captured by one or more imaging sensors depicting, in one or more infrared spectral ranges, one or more surfaces of one or more road segments painted with one or more reference markings using one or more paint materials characterized by: (1) reflecting light in visible light spectral range deviating less than a first value from the light reflected by the one or more surfaces, and (2) reflecting light in one or more infrared spectral ranges deviating more than a second value from the light reflected by the one or more surfaces.

Analyzing the one or more infrared images to determine a position of the one or more reference markings.

Calibrating the one or more imaging sensors according to the computed position of the one or more reference markings.

According to a seventh aspect of the present invention there is provided a system for calibrating imaging sensors deployed to monitor roads traffic according to infrared visible reference markings, comprising one or more processor configured to execute a code. The code comprising:

Code instruction to receive one or more one or more infrared images captured by one or more imaging sensors depicting, in one or more infrared spectral ranges, one or more surfaces of one or more road segments painted with one or more reference markings using one or more paint materials characterized by: (1) reflecting light in visible light spectral range deviating less than a first value from the light reflected by the one or more surfaces, and (2) reflecting light in one or more infrared spectral ranges deviating more than a second value from the light reflected by the one or more surfaces.

Code instruction to analyze the one or more infrared images to determine a position of the one or more reference markings.

Code instruction to calibrate the one or more imaging sensors according to the computed position of the one or more reference markings.

According to an eighth aspect of the present invention there is provided a reference markings painted on one or more surfaces of one or more road segments using one or more paint materials characterized by: (1) reflecting light in visible light spectral range deviating less than a first value from the light reflected by the one or more surfaces, and (2) reflecting light in one or more infrared spectral ranges deviating more than a second value from the light reflected by the one or more surfaces. Wherein the reference markings perceptible in the infrared spectral range while significantly imperceptible in the visible spectral range are detectable in the infrared spectral range for calibrating one or more imaging sensors deployed to monitor transportation traffic in the one or more road segments.

In a further implementation form of the first, second, third, fourth, fifth, sixth, seventh and/or eighth aspects, the first value equals 20% and the second value equals 25%.

In a further implementation form of the first, second, third, fourth, fifth, sixth, seventh and/or eighth aspects, the one or more infrared spectral ranges are members of a group consisting of: near infrared (NIR) having a wavelength in a range of 750-1400 nanometer, and short wave infrared (SWIR) having a wavelength in a range of 1400-3000 nanometer.

In a further implementation form of the second value of the one or more paint materials characterizes the one or more paint materials to transfer more than a fourth value of light in the one or more infrared spectral ranges thus exposing the one or more background patterns painted beneath the one or more paint materials. The fourth value equals 85%.

In a further implementation form of the first, second, third, fourth and/or fifth aspects, the one or more dynamic objects are members of a group consisting of: a vehicle and a pedestrian.

In an optional implementation form of the first, second, third, fourth and/or fifth aspects, a plurality of background patterns are painted on the one or more surfaces suing a plurality of paint materials such as the one or more paint materials which are further characterized by reflecting light in the one or more infrared spectral ranges deviating from each other by more than a third value, the third value equals 25%.

In a further implementation form of the first, second, third, fourth and/or fifth aspects, the one or more images are analyzed to compute one or more attributes of the one or more identified objects. The one or more attributes are members of a group consisting of: a size, a length, a width, a height, a speed, an acceleration and a movement direction.

In a further implementation form of the first, second, third, fourth and/or fifth aspects, the one or more surfaces on which the one or more background patterns are painted comprise one or more members of a group consisting of: a road surface, a sidewalk surface and a transportation infrastructure object surface.

In a further implementation form of the first, second, third, fourth and/or fifth aspects, the one or more background patterns are applied over one or more of the surfaces which are already painted with one or more paint materials perceptible in the visible light range.

In a further implementation form of the sixth, seventh and/or eighth aspects, the one or more reference markings further comprising an identifier of the one or more road segments.

In a further implementation form of the sixth, seventh and/or eighth aspects, the one or more reference markings are applied over one or more of the surfaces which is already painted with one or more paint materials perceptible in the visible light range.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
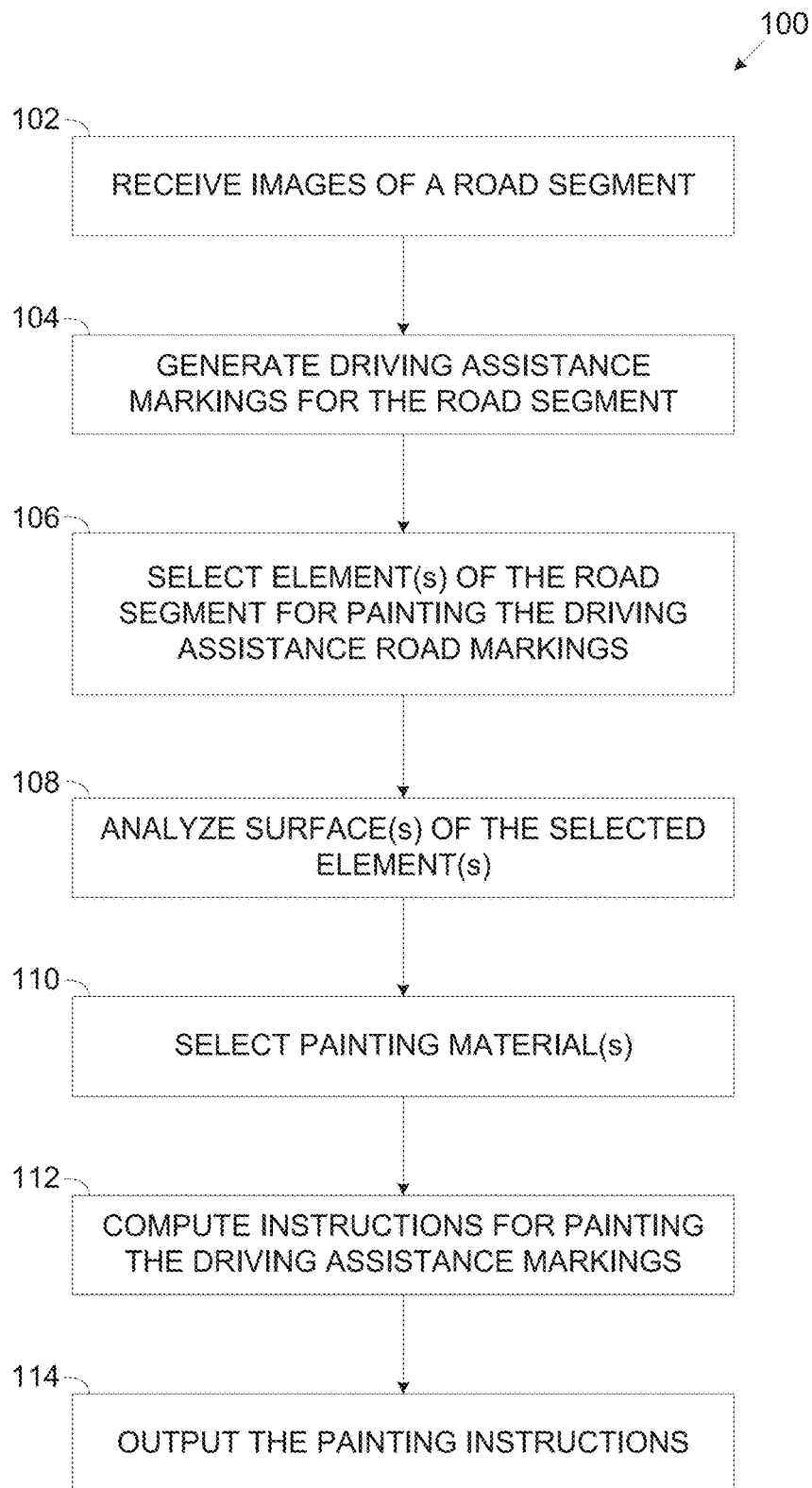
FIG. 1 is a flowchart of an exemplary process of computing instructions for painting driving assistance marking using paint material(s) visible in the infrared spectrum while imperceptible in the visible light spectrum, according to some embodiments of the present invention.

The present invention, in some embodiments thereof, relates to painting road markings to support object detection, and, more specifically, but not exclusively, to painting road markings visible in the infrared spectrum while imperceptible in the human visible light spectrum to support object detection.

According to some embodiments of the present invention, there are provided methods, systems and computer program products for computing instructions for painting driving assistance markings which are highly visible in the infrared light spectrum while highly imperceptible in the visible light spectrum. In particular, the driving assistance markings may significantly blend with their background in the visible light range making them significantly imperceptible by the human eye and thus invisible to human drivers.

The term imperceptible as used here in through the document defines objects, markings, printing and/or the like, in particular driving assistance markings which may not be perceived by the human eye since they reflect light in a spectral range which is out of the visible light spectral range (400-700 nanometer).

These driving assistance markings which are highly imperceptible to the human drivers are therefore directed to support automated vehicular systems, for example, an Advanced Driving Assistance System (ADAS), a vehicular monitoring system, a vehicular alert system, a vehicular control system and/or the like installed in one or more vehicles which may be manual, partially autonomous and/or fully autonomous.

Specifically, the driving assistance markings are directed for such automated vehicular systems which are capable of operating in the infrared light spectrum, in particulate, systems which are coupled, integrated and/or connected to one or more imaging sensors, for example, a camera, an infrared camera, a thermal mapping camera, a Light Detection and Ranging (LiDAR) sensor and/or the like configured to capture images of the vehicle's surroundings in the infrared spectrum, for example, Near Infrared (NIR), Short Wave Infrared (SWIR) and/or the like.

The driving assistance markings generated for one or more road segments may express informative directions and/or operation assistance information. For example, one or more informative driving assistance markings may indicate presence and optionally distance to one or more objects in the respective road segment and/or of one or more subsequent road segments, for example, a pedestrian crossing, a railroad crossing, a traffic light, a junction, a maximal allowed speed and/or the like. In another example, one or more operation assistance driving assistance markings may include markers, pointers, guides, keys and/or the like which may be identified and used by the automated vehicular systems to maneuver the vehicles, for example, break, accelerate, decelerate, turn and/or the like.

The driving assistance markings generated for the road segment(s) may be painted (applied) on one or more elements of the respective road segment, for example, one or more surface sections of the road segment, one or more colored marks painted on the road segment (e.g., lane separator lines, arrows, stop lines, pedestrian crossings, etc.) and/or one or more infrastructure objects located in proximity to the road segment (e.g., next to, on, above, etc.), for example, pavement surfaces and/or edges, traffic poles, traffic lights, structure walls and/or the like.

In order to ensure that the driving assistance markings are highly visible in the infrared spectrum while substantially imperceptible in the visible light spectrum and hence imperceptible to the human drivers, the driving assistance markings may be painted to significantly blend with their background in the visible light range while be significantly distinguishable from their background in the infrared spectral range. To this end the driving assistance markings may be painted using one or more infrared reflective paint materials which are characterized by two main characteristics.

First, the infrared reflective paint materials selected for painting the driving assistance markings must not significantly deviate from the color of the surface of the element(s) selected for painting the driving assistance markings. This means that the visible light reflected by the selected infrared reflective paint material(s) must not deviate by more than a certain value (e.g. 10%, 15%, 20%, etc.) from the visible light spectrum reflected by the surface of the selected element(s).

In addition, the infrared reflective paint materials selected for painting the driving assistance markings must be significantly distinguishable from the surface of the selected element(s) in the infrared spectrum. This means that the infrared spectral range reflected by the selected infrared reflective paint material(s) must deviate by more than a certain value (e.g. 25%, 30%, 35%, etc.) from the infrared spectral range reflected by the surface of the selected element(s).

While for brevity the paint material(s) selected for painting the driving assistance markings are designated infrared reflective paint materials, obviously, the deviation of the infrared reflective paint material(s) compared to their background may be to both directions. This means that the paint material(s) used for painting the driving assistance markings may be more infrared reflective or more absorptive compared to the surrounding background of the markings, i.e., the surface of the selected element(s) on which the markings are painted. When the paint material(s) is more infrared reflective, the driving assistance markings will reflect more infrared light compared to their surrounding background and will be thus visible in the infrared spectrum range. When the paint material(s) is more infrared absorptive, i.e., less infrared reflective, the driving assistance markings will reflect less infrared light compared to their surrounding background and will be therefore also visible in the infrared spectrum range.

Optionally, the driving assistance markings may be painted in proximity, specifically closely around one or more visible road markings of one or more of the road segments, for example, lane separator markings, road side border line markings, pedestrian crossings, painted direction symbols, painted text and/or the like.

Painting the driving assistance markings using the infrared reflective paint materials and computing instructions thereof may present major advantages and benefits compared to currently existing methods and systems for applying road markings in roads.

First, while the human perception and recognition of road markings may be limited, the automated vehicular systems may have a significantly larger capacity for detecting and recognizing large volumes of road markings. These automated vehicular systems may therefore benefit from extensive additional driving assistance markings which may express and deliver increased volumes of information relating to the road segments and/or may provide increased, improved and/or enhanced assistance with vehicle control actions. However, in case the extensive road markings are visible as may be done using existing methods for applying road markings, the road markings may cause a major clutter which may significantly overload human drivers' perception which may lead to human mistakes potentially resulting in dangerous scenarios and increased risk on the road. In contrast, painting (applying) the additional driving assistance markings using the infrared reflective paint material(s) such that the driving assistance markings are imperceptible to the human drivers while visible to the infrared capable automated vehicular systems may overcome the clutter limitation while highly enhancing the assistance and support to the automated vehicular systems.

Moreover, existing (legacy) automated vehicular systems which similarly to the human drivers rely on visible light road markings may be also highly degraded in case the additional driving assistance markings are visible in the visible light spectrum. Such existing (legacy) automated vehicular systems may be limited in their ability to distinguish between extensive road markings painted in close proximity and all visible in the same light spectrum. On the other hand, the existing automated vehicular systems may be oblivious and unaware of the additional driving assistance markings which are only visible in the infrared spectrum thus prevent the overload and degradation in the operation of these legacy systems.

Furthermore, applying (painting) driving assistance markings in two different light spectrums, namely the visible light and the infrared spectrums may allow for increased detection and/or redundancy since the road markings, even identical markings, may be captured by imaging sensors in two distinct domains. The performance, for example, accuracy, robustness, reliability and/or certainty of the detection of the automated vehicular systems may be highly increased when relying on imagery data captured in both the visible light and infrared spectrums, typically by different imaging sensors. Moreover, visible light markings may be significantly undetectable under certain circumstances, for example, low illumination, large distance and/or the like. Relying on the infrared visible road markings may therefore enable the automated vehicular systems to operate with high performance in such scenarios.

In addition, distracting objects which are typically visible in the visible light spectrum, for example, spilled paint, trash and/or any other object that may be located on the road segment or in its close vicinity may be erroneously detected and/or interpreted by the automated vehicular systems as valid road markings which are visible in the visible light spectrum. Such degraded detection may result in potential erroneous detection that may lead to dangerous, critical and even fatal situation. Painting the driving assistance markings to be visible in the infrared spectrum, on the other hand, may significantly increase the detection performance, specifically robustness, reliability and/or reliability since infrared reflectance and/or absorption may be rare in naturally occurring objects such as the distracting objects thus making these naturally occurring objects significantly imperceptible in the infrared spectrum which may reduce and even completely prevent erroneous detection of these object as valid road markings.

Also, adding visible road markings (visible in the visible light spectrum) may be subject to regulation since they may affect the road conditions and perception as described herein before. Adding the infrared visible driving assistance markings on the other hand, may not be subject to any such regulation which may be highly costly, timely and/or demanding, since the additional road markings are imperceptible and practically invisible to the human drivers and/or to the existing automated vehicular systems configured to operate in the visible light spectrum.

Finally, painting the infrared visible driving assistance markings in proximity to visible road markings may significantly increase accuracy, robustness, reliability and/or certainty of the automated vehicular systems to detect of the driving assistance markings. Moreover, the automated vehicular systems may ignore and/or avoid erroneous interpretation of potential infrared reflective materials and/or sections of the road segment arbitrarily present in one or more of the road segments.

According to some embodiments of the present invention, there are provided methods, systems and computer program products for computing instructions for painting, in one or more road segments, road markings which are highly perceptible (visible) in one or more infrared spectral ranges, for example, NIR, SWIR and/or the like while highly imperceptible (invisible) in the visible light spectral range.

In particular, the road markings comprising one or more background patterns may be painted on one or more surfaces of the road, sidewalk and/or practically any other transportation infrastructure object (e.g. signs, poles, barrier rails, bridges, etc.) are painted and marked to support detection of one or more dynamic objects, for example, a vehicle (e.g. car, motorcycle, bicycle, truck, bus, train, etc.), a pedestrian and/or the like passing in front of the background pattern(s).

For brevity, the term reflection is used herein after for both reflection and absorption since light reflection and absorption are practically two sides of the same phenomena where high light reflectiveness may be regarded as low light absorption and vice versa low light reflectiveness may be regarded as high light absorption. Similarly, the term infrared reflective material may designate both materials which are highly reflective and/or highly absorptive in terms of reflected infrared light The background patterns may be painted on the road surface in one or more shapes, sizes and/or the like using one or more paint materials (colors) characterized by reflecting visible light deviating by less than a first value, for example, 10%, 15%, 20% and/or the like from the visible light reflected by the surface on which they are painted. However, the light reflected by the background patterns in one or more of the infrared spectral ranges, for example, NIR, SWIR and/or the like may deviate by more than a second value, for example, 20%, 25%, 30% and/or the like from the infrared light reflected by the surface.

Moreover, a plurality of background patterns may be painted on the surface using a plurality of paint materials which differ from each other in their infrared reflectiveness (or absorption) by more than a third value, for example, 20%, 25%, 30% and/or the like. As such, even if one or more of the dynamic objects reflect infrared light which does not significantly deviate from the infrared light reflected by the background pattern(s) painted using a first paint material, the infrared light reflected by the dynamic object(s) may significantly deviate from the infrared light reflected by the background pattern(s) painted using a second paint material which is different in its infrared reflection characteristics from the first paint material.

Optionally, one or more of the paint materials may be characterized by reflecting visible light deviating by less than the first value from the visible light reflected by the selected surface(s) while transferring at least some and typically most of the infrared light in one or more of the infrared spectral ranges (e.g. NIR, SWIR, etc.). As such, one or more of the background patterns may be painted on the selected surfaces which may be further painted with the at least partially infrared transparent paint material(s). As such while blending with the surface in the visible light spectrum, the at least partially infrared transparent paint material(s) may become at least partially transparent in the infrared spectral range(s) thus exposing the background pattern(s) painted beneath them.

One or more object detection systems, in particular object detection systems deployed to detect transportation traffic, for example, vehicle traffic, pedestrians traffic and/or the like may be configured to identify one or more of the dynamic objects in particular when passing in front of one or more of the background patterns painted on one or more of the surfaces (e.g. road surface, sidewalk surface, etc.) of one or more road segments which are highly imperceptible in the visible light spectral range while highly visible in the infrared spectral range(s), for example, NIR, SWIR and/or the like.

The object detection system(s) may receive sensory data, specifically, imagery data (i.e. images) of the road surfaces, sidewalk surfaces and/or other surfaces of one or more of the road segments painted with one or more background patterns from one or more imaging sensors deployed to monitor the road segment(s).

The object detection system(s) may analyze the captured images to identify one or more of the dynamic objects passing in front of the backgrounds pattern(s) which may be highly detectable due to their different infrared light reflection characteristics compared to the backgrounds pattern(s) painted with the highly reflective paint material(s). The object detection system(s) may analyze the captured images using one or more methods, techniques and/or algorithms as known in the art, for example, computer vision, image processing, classification functions and/or models (classifiers) and/or the like.

The object detection system(s) may further analyze the captured images to track the identified dynamic object(s) in consecutive images and may compute one or more attributes of the identified dynamic object(s) accordingly, for example, a dimension (e.g. size, length, width, height, etc.), a speed, an acceleration, a movement direction (vector) and/or the like.

According to some embodiments of the present invention, there are provided methods, systems and computer program products for computing instructions for painting, in one or more road segments, reference markings which are highly perceptible (visible) in one or more infrared spectral ranges, for example, NIR, SWIR and/or the like while highly imperceptible (invisible) in the visible light spectral range.

Optionally, one or more of the reference markings may be painted beneath one or more of the at least partially infrared transparent paint materials which may become transparent in the infrared spectral range(s) thus exposing the reference markings painted beneath them.

The reference markings may be painted on one or more surfaces of the road segment(s) to support calibration of imaging sensors deployed to capture imagery data of the road segments. The reference markings may be further painted to support traffic detection by one or more transportation traffic monitoring systems, for example, a red light crossing detection system, a lane crossing detection system, an accident analysis system and/or the like.

The reference markings may be painted according to one or more predefined patterns, symbol, marks, dimensions, locations and/or the like which may be used to calibrate the imaging sensor(s). For example, one or more reference markings may be painted on the road surface of a cretin intersection at one or more predefined locations, for example, a center of the intersection, at each entry point to the intersection, across the intersection and/or the like. In such case, one or more imaging sensors deployed to monitor the certain intersection which are configured to operate in the infrared spectral range(s) may capture images depicting the reference marking(s). Based on the location, position, dimensions and/or the like of the reference markings detected by analyzing the captured images, the imaging sensor(s) may be automatically calibrated and adapted to their exact location and positioning in the certain intersection.

Moreover, one or more reference markings may be further painted to mark one or more elements and/or objects in one or more of the road segments, for example, a lane separation line, a stop line, a pedestrian crossing, an intersection entry point, an intersection exit point and/or the like. One or more of the traffic monitoring systems may use these reference markings to improve their detection and/or analysis functionality. For example, a certain traffic monitoring system configured to detect vehicles entering an intersection on red light may analyze images depicting the intersection and passing vehicles. Based on analysis of the image(s) captured in the inferred spectral range(s), the traffic monitoring system may detect one or more reference markings designating, for example, one or more entry points to the intersection and/or one or more exit point from the intersection. Based on the detected reference markings, the traffic monitoring system may accurately identify vehicles crossing the entry point(s) and/or exit point(s) including accurate timing of the crossing.

Painting the background patterns and the reference markings, collectively designated additional road markings, using the infrared reflective and/or absorptive paint material(s) to support object detection may present major advantages and benefits compared to currently existing methods and systems for object detection.

First, detection performance, for example, accuracy, reliability and/or the like of the dynamic objects against the background patterns painted using the infrared reflective paint materials may be significantly improved compared to the detection performance of the dynamic objects over surfaces colored in visible light colors as may be done by the existing object detection methods. This is because the color of the dynamic objects may be very similar in the visible light spectral range to that of the background surfaces. In addition, visible light colors and respective paint materials may be highly sensitive to lighting and/or illumination conditions as well as to light reflections by mirror like surfaces. The infrared reflective paint materials on the other hand may provide a significantly improved contrast to the dynamic objects in the infrared spectral range(s) thus significantly improving the detection performance of the dynamic objects. Operating in the infrared spectral range is also significantly more robust compared to the visible light range with respect to lighting, illumination, reflections and/or the like which are highly common in the visible light range. These advantages are further increased when the object detection is applied to detect far away dynamic objects which may therefore appear very small in the images since the limitations described herein before (color similarity with the background and/or susceptibility to lighting and reflections) may be significantly increased when the objects to be detected occupy just a small portion of the image.

Moreover, painting the reference markings may enable automated calibration of the imaging sensors deployed to monitor the road segments thus eliminating the need for specifically calibrating each imaging sensor, typically manually, according to its specific deployment location and conditions (e.g., height, view angle, etc.). In addition, using the reference markings designating various elements of the road segments (e.g. lanes, stop lines, road edges, intersection entry/exit points, etc.) may significantly improve the performance of the traffic monitoring system(s) which may more easily detect the dynamic objects (e.g., vehicles, pedestrians, etc.) relative to the road segments infrastructure. The reference markings may be further used to dynamically calibrate the imaging sensor(s) over time as their position and/or orientation may shift over time due to, for example, wind, vibrations and/or the like.

Furthermore, as described herein before, painting the additional road markings (background patterns and/or the reference markings) using infrared reflective paint material(s) imperceptible in the visible light range may make the additional road markings highly usable by the automated traffic monitoring systems while avoiding excessive visual clutter potentially overloading the human driver perception as may happen should the additional road markings were visible in the visible light spectral range.

In addition, as they are imperceptible (invisible) in the visible light spectral range, the additional road markings may not be subject to excessive and strict regulation as is required for road markings visible in the visible light spectral range.

Also, capturing images in the infrared spectrum to support detection of the background patterns may be done using standard equipment, for example, infrared sensors, LiDAR sensors and/or the like which are highly available and common in a plurality of already deployed traffic monitoring systems and therefore impose no additional costs, complexity and/or effort to facilitate capturing of the infrared images.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of computing instructions for painting driving assistance marking using paint material(s) visible in the infrared spectrum while imperceptible in the visible light spectrum, according to some embodiments of the present invention.

An exemplary process 100 may be executed for computing instructions for painting driving assistance markings to support one or more automated vehicular systems, for example, an ADAS system, a vehicular monitoring system, a vehicular alert system, a vehicular control system and/or the like installed in one or more vehicles which may be fully manual with one or more alert systems, partially autonomous and/or fully autonomous.

Specifically, the driving assistance markings are painted on one or more elements of one or more road segments such that the driving assistance markings are highly visible in the infrared spectral range (e.g. NIR, SWIR) while significantly imperceptible and thus practically invisible in the visible light range. Imperceptible in the visible light spectrum, the driving assistance markings are therefore highly imperceptible by human drivers as well as to automated vehicular systems which are based in visible light imaging.

Automated vehicular systems which are capable of analyzing infrared spectrum images on the other hand may identify the driving assistance markings which may express informative and/or operation assistance information.

The imperceptible driving assistance markings may therefore provide additional driving assistance information beyond the traditional road markings which may be used by the infrared enabled vehicular systems while preventing visual clutter which may overload perception of the drivers and/or of the visual light spectrum based systems.

Figure 2:
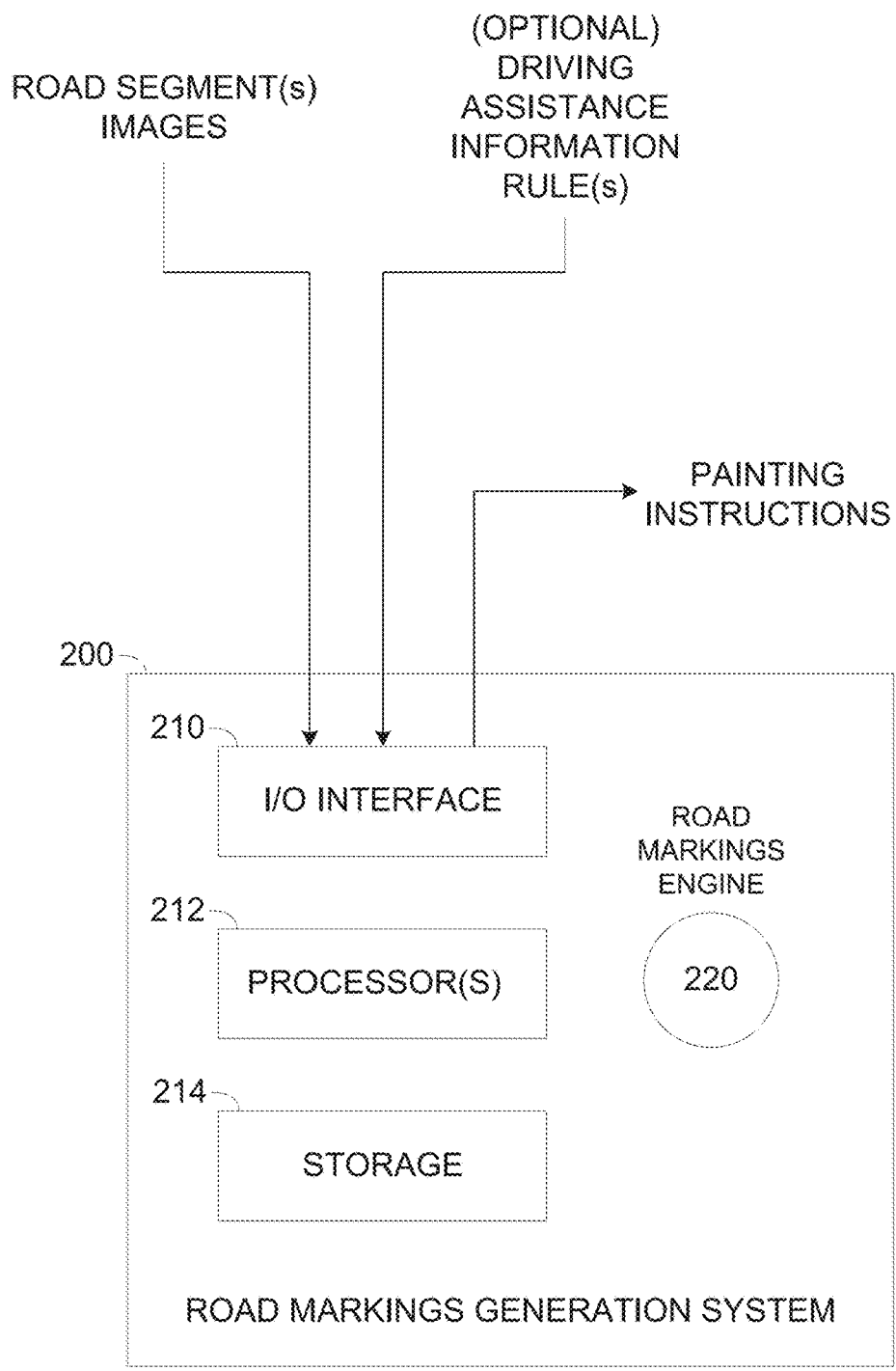
FIG. 2 is a schematic illustration of an exemplary system for computing instructions for painting driving assistance marking using paint material(s) visible in the infrared spectrum while imperceptible in the visible light spectrum, according to some embodiments of the present invention.

Reference is also made to FIG. 2, which is a schematic illustration of an exemplary system for computing instructions for painting driving assistance marking using paint material(s) visible in the infrared spectrum while imperceptible in the visible light spectrum, according to some embodiments of the present invention.

An exemplary road markings generation system 200, for example, a computer, a server, a processing node, a cluster of computing nodes and/or the like may be configured to execute a process such as the process 100 for computing instructions for painting driving assistance markings which are visible in in the infrared spectrum wile imperceptible in the visible light spectrum.

The road markings generation system 200 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface, a Radio Frequency (RF) interface and/or the like.

Via the I/O interface 210, the road markings generation system 200 may obtain, for example, fetch, receive, acquire and/or the like one or more images of one or more road segments. For example, the road markings generation system 200 may connect to one or more of the networks, through the network interface(s) available in the I/O interface 210, to communicate with one or more networked resources storing one or more of the images. In another example, the road markings generation system 200 may access one or more attachable devices attached to interconnection interface(s) available in the I/O interface 210, for example, a USB storage device storing, capturing and/or recording one or more of the images.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally, integrate, utilize and/or facilitate one or more hardware elements (modules) integrated and/or utilized in the road markings generation system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof. For example, the processor(s) 212 may execute a road markings engine 220 functional module for executing the process 100 to generate driving assistance markings and compute instructions for painting the driving assistance markings using one or more infrared visible paint materials such that the driving assistance markings are highly visible in the infrared spectrum while significantly imperceptible and potentially completely invisible in the visible light spectrum.

The road markings engine 220 may further output the painting instructions computed for painting the driving assistance markings using one or more of the infrared visible paint materials.

Optionally, the road markings engine 220 may receive one or more driving assistance information rules which may be applicable for one or more of the road segments.

Optionally, the road markings generation system 200, specifically the road markings engine 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like.

For brevity, the process 100 executed by road markings engine 220 is described for computing instructions for painting driving assistance markings in a single road segment. This, however, should not be construed as limiting since the process 100 may be expanded for computing painting instructions for driving assistance markings in a plurality of road segments.

As shown at 102, the process 100 starts with the road markings engine 220 receiving one or more images of a road segment.

The image(s) may be captured at ground level, from an elevated location (e.g. building, poles, posts, etc.), from the air (e.g. by a drone, an aircraft, etc.), from space (satellite) and/or the like such that the road segment may be depicted from one or more elevation points and/or angles.

The road markings engine 220 may receive the image(s) from one or more sources. For example, one or more images may be retrieved from one or more data stores, for example, a database, a storage server, a storage service and/or the like which stores images depicting one or more road segments. In another example, one or more of the images may be received from one or more mapping services, for example, goggle earth, google street view and/or the like.

As shown at 104, the road markings engine 220 may generate driving assistance markings for the road segment, in particular the road markings engine 220 may generate the driving assistance markings based on analysis of the image(s) of the road segment.

The computed driving assistance markings are directed to support one or more automated vehicular systems of one or more vehicles riding through the road segment. Such automated vehicular systems may include, for example, one or more ADAS systems as known in the art configured to assist vehicle drivers. In another example, the automated vehicular systems may include one or more monitoring systems configured to monitor the environment of the vehicle and report, alert and/or otherwise indicate of one or more potential hazards, risks and/or conditions detected in the road segment. In another example, the automated vehicular systems may include one or more automatic vehicular control systems of one or more at least partially autonomous vehicles configured to control operation of the vehicle (e.g. break, maneuver, accelerate, etc.) based on one or more conditions, potential hazards and/or the like detected in the road segment.

Specifically, the driving assistance markings generated by the road markings engine 220 are intended to be added (painted) to the road segment such that the driving assistance markings are visible in the infrared spectrum, for example, NIR, SWIR and/or the like while significantly imperceptible in the visible light spectrum. The driving assistance markings are therefore directed to support automated vehicular systems which are capable of operating in the infrared spectrum, in particular, automated vehicular systems which integrate, employ, connect and/or communicate with one or more imaging sensors, for example, a camera, infrared camera, a thermal camera, a Light Detection and Ranging (LiDAR) sensor and/or the like adapted to operate in the infrared spectral range, for example, NIR, SWIR and/or the like.

The driving assistance markings generated by the road markings engine 220 may express driving information relating to the road segment. The driving information expressed by the driving assistance markings may include descriptive information relating to one or more transportation infrastructure objects located in the road segment as identified by analyzing the image(s), for example, a junction, a traffic light, a traffic sign, a pedestrian crossing, a bridge, a tunnel, a freeway and/or the like. For example, assuming there is a 4-way junction in the road segment with traffic lights and pedestrian crossings in all four directions. In such case, the road markings engine 220 may generate driving assistance markings which report the presence of the 4-way junction in the road segment. In particular, the road markings engine 220 may generate driving assistance markings which indicate the distance to the 4-way junction in the road segment, for example, the 4-way junction is 50 meters ahead, 30 meters ahead, 10 meters ahead and/or the like. In another example, assuming there is a sharp left curve in the road segment. In such case, the road markings engine 220 may generate driving assistance markings which report the presence of the sharp left curve in the road segment and may further configure the driving assistance markings to indicate the distance to the sharp left curve.

The driving assistance markings may further express driving information directed to assist one or more of the automatic vehicular control systems of at least one vehicle to conduct at least one control operation of the at least one vehicle. For example, assuming there is a sharp right curve in the road segment. In such case, the road markings engine 220 may generate orientation points road markings extending from a certain distance before the beginning of the right curve through the curve and until the curve end which may be used by the automatic vehicular control system(s) to accurately maneuver the respective vehicle(s) in the sharp curve. In another example, assuming there is a traffic light in the road segment. In such case, the road markings engine 220 may mark a stop line road markings right before the traffic light where vehicles must come to a complete stop. The stop line road markings may be used by as orientation points by the automatic vehicular control system(s) to identify the exact stop location and may control the vehicle(s) accordingly, apply breaks to fully stop the vehicle(s).

The driving assistance markings generated by the road markings engine 220 may express driving information similar to driving information expressed by visible road markings in the road segment which are visible in the visible light spectrum. This may of course be essential for supporting automatic vehicular control systems connected to imaging sensors which operated only in the infrared spectrum and hence monitor the surrounding of the vehicles in the infrared spectrum. However, duplicating the driving assistance markings may also serve for redundancy and/or to improve detection of the road markings in both the visible light spectrum and in the infrared spectrum for automatic vehicular control systems capable of monitoring the surrounding of the vehicle(s) in both the visible light and infrared spectrums.

However, the driving assistance markings generated by the road markings engine 220 may include and/or express additional driving information which is not expressed and/or available from the visible road markings. Traditionally, the road markings are directed for human drivers and are thus presented (painted, drawn, placed, etc.) to be visible in the visible light spectrum. The amount of information expressed by the road markings which may be efficiently consumed and comprehended by human drivers may be limited. The automatic vehicular control system(s) on the other hand may be able to acquire and process much larger volumes of driving information expressed by road markings. However, adding additional driving information visible to the human drivers may lead to major clutter which may overload perception and/or confuse the human drivers and may be therefore inefficient and potentially dangerous. Expressing the additional driving information via the infrared visible driving assistance markings may therefore overcome this limitation since the driving assistance markings are substantially and potentially completely imperceptible to the human drivers while visible to the infrared capable automatic vehicular control system(s) which may use the additional driving information.

The driving assistance markings may include human readable markings which may be identified and recognized by automatic vehicular control system(s) designed, configured and/or adapted to rely on road markings directed for human drivers. However, the driving assistance markings may further include markings, signs, symbols, expressions and/or the like which are directed for machines and may thus not be comprehended by humans, for example, coded data (e.g. barcode, QR code, etc.), machine language symbolic data and/or the like. While incomprehensible by humans, automatic vehicular control system(s) configured accordingly may be of course able to identify, decipher and use such machine directed driving assistance markings.

Optionally, the road markings engine 220 may generate driving assistance markings which are applied in the (current) road segment but may relate to one or more transportation infrastructure objects located in one or more subsequent road segments located after the (current) road segment. For example, assuming there is a mountain tunnel one mile ahead of the (current) road segment. Further assuming that one or more automatic vehicular control system(s) include radar sensors highly suitable for low and/or no illumination imaging. In such case, the automatic vehicular control system(s) may bring the radar sensors online and/or test them prior to entry into the tunnel.

Optionally, the road markings engine 220 may compute one or more of the driving assistance markings according to one or more of the driving assistance information rules which may be received from one or more sources.

The driving assistance information rules may include one or more general rules applicable for a plurality of road segments sharing one or more parameters and/or attributes. For example, a certain general driving assistance information rule may indicate that each road segment which comprises a pedestrian crossing should include driving assistance markings at one or more locations preceding the pedestrian crossing (e.g. 100 meters, 50 meters, 15 meters, etc.) to inform of the upcoming pedestrian crossing. In another example, a certain general driving assistance information rule may indicate that driving assistance markings should be included in each road segment to indicate a maximum speed allowed in the respective road segment. In another example, a certain general driving assistance information rule may indicate that curve orientation points driving assistance markings should be included in each road segment comprising one or more curves exceeding a certain curve angle, for example, 10 degrees, 15 degrees, 25 degrees and/or the like.

However, the driving assistance information rules may also include one or more specific rules applicable for one or more specific road segments. For example, a certain specific driving assistance information rule may indicate that special driving assistance markings should be applied in the road segment in case the specific road segment includes a traffic circle immediately followed by another traffic circle within less than a certain distance, for example, 50 meters, 80 meters and/or the like. The special driving assistance markings which may be applied before the first circle may express the multiple traffic circles which may require some special attention by tone or more of the automatic vehicular control systems.

As shown at 106, the road markings engine 220 may analyze the image(s) of the road segment to identify and select one or more elements of the road segment which are suitable for applying (painting) the driving assistance markings generated for the road segment.

The elements on which the driving assistance markings may be painted nay include, for example, one or more surface sections of the road segment, one or more colored marks painted on the road segment, one or more infrastructure objects located in proximity to the road segment (e.g., next to, on, above, etc.) and/or the like. The colored marks painted on the road segment may include visible road markings such as, for example, lane separator markings, road side border line markings, pedestrian crossings, painted direction symbols (e.g., arrows, stop lines, etc.), painted text (e.g. stop, slow, etc.) and/or the like. The infrastructure objects may include, for example, pavement edges, traffic poles, traffic lights, structures wall and/or the like.

Figure 3A:
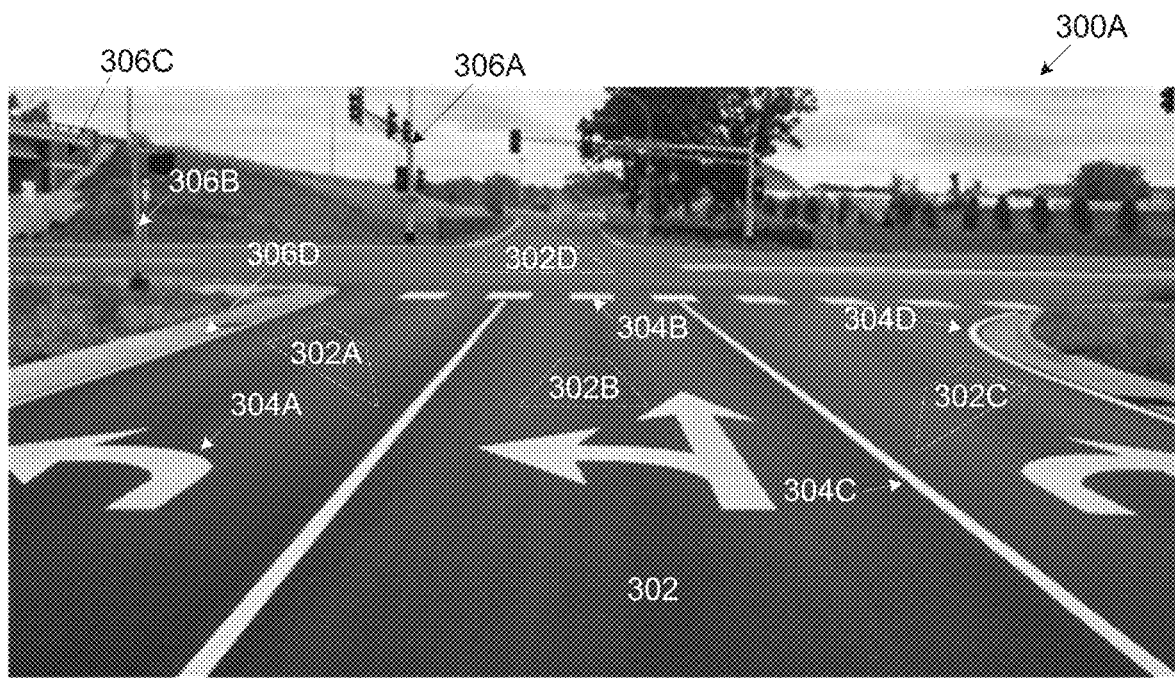
FIG. 3A and FIG. 3B are exemplary road segments comprising elements suitable for painting driving assistance marking painted using paint material(s) visible in the infrared spectrum while imperceptible in the visible light spectrum, according to some embodiments of the present invention.
Figure 3B:

Reference is now made to FIG. 3A and FIG. 3B, which are exemplary road segments comprising elements suitable for painting driving assistance markings painted using paint material(s) visible in the infrared spectrum while imperceptible in the visible light spectrum, according to some embodiments of the present invention.

An exemplary road segment 300A may comprise a plurality of elements which may be identified by a road markings engine such as the road markings engine 220 as suitable for applying (painting) the driving assistance markings generated for the road segment. For example, the road markings engine 220 analyzing one or more images of the road segment 300A may identify one or more surface sections 302 of the road segment 300A which may be suitable for painting the driving assistance markings, for example, surface section 302A, 302B, 302C and/or 302D. In another example, the road markings engine 220 analyzing one or more images of the road segment 300A may identify one or more visible road markings 304 painted in the road segment 300A which may be suitable for painting the driving assistance markings, for example, an arrow marking 304A, a pedestrian crossing marking 304B a lane separator line 304C and and/or a road border line 302D. In another example, the road markings engine 220 analyzing one or more images of the road segment 300A may identify one or more infrastructure object 306 of the road segment 300A which may be suitable for painting the driving assistance markings, for example, a traffic light pole 306A, a lighting pole 306B, a wall of a bridge 306C and/or a sidewalk surface 306D.

An exemplary road segment 300B may also comprise a plurality of elements which may be identified by the road markings engine 220 as suitable for applying (painting) the driving assistance markings generated for the road segment. For example, the road markings engine 220 analyzing one or more images of the road segment 300B may identify one or more visible road markings 304 painted in the road segment 300B which may be suitable for painting the driving assistance markings, for example, a road border line 302D. In another example, the road markings engine 220 analyzing one or more images of the road segment 300B may identify one or more infrastructure object 306 of the road segment 30BA which may be suitable for painting the driving assistance markings, for example, a side barrier rail 306E.

The road markings engine 220 may therefore analyze the image(s) to identify one or more elements in the road segments which may be suitable for painting the generated driving assistance markings. In particular, the road markings engine 220 may select one or more of the identified elements according to the generated driving assistance markings.

For example, assuming the road segment comprises a pedestrian crossing and the road markings engine 220 generated driving assistance markings accordingly to indicate the presence of the pedestrian crossing and further indicate a distance to the pedestrian crossing. In such case, the road markings engine 220 may select one or more visible road markings, for example, lane separator lines for applying (painting) the driving assistance markings. In particular, the road markings engine 220 may select one or more lane separator lines and/or line sections which are located at the distance from the pedestrian crossing as indicated by the respective driving assistance markings. For example, assuming three driving assistance markings are generated to indicate the pedestrian crossing is 10, 30 and 50 meters ahead. In such case, the road markings engine 220 may select three lane separator lines and/or line sections located at 10, 30 and 50 meters before the pedestrian crossing on which the respective driving assistance markings may be painted.

In another example, assuming the road segment comprises a junction and the road markings engine 220 generated driving assistance markings accordingly to indicate the presence of the junction. In such case, the road markings engine 220 may select one or more road surfaces of the road segment for applying (painting) the driving assistance markings indicating the upcoming junction. For example, the road markings engine 220 may select a plurality of consecutive surface sections of the road segment for painting decrementing distance values to the junction.

In another example, assuming the road segment comprises a railroad intersection and the road markings engine 220 generated driving assistance markings accordingly to indicate the presence of the railroad intersection. In such case, the road markings engine 220 may select one or more infrastructure objects, for example, a slowdown traffic sign pole for applying (painting) the driving assistance markings indicating the upcoming railroad intersection.

Moreover, the road markings engine 220 may adjust one or more of the driving assistance markings according to the selected element(s) on which the driving assistance markings generated for the road segment are to be painted. For example, assuming the road markings engine 220 selects a traffic pole located 45 meters before an intersection for painting driving assistance markings indicative of the intersection, the road markings engine 220 may adjust and/or generate the driving assistance markings which are to be applied on the traffic pole to indicate that the intersection is 45 meters ahead. In another example, assuming the road markings engine 220 selects a series of lighting poles distributed along a sharp curve for applying (paining) orientation points driving assistance markings to assist the automatic vehicular control systems to maneuver the vehicles along the curve. In such case, the road markings engine 220 may adjust the size of the orientation points to fit the lighting poles while ensuring high visibility of the orientation points.

As shown at 108, the road markings engine 220 may analyze one or more of the surfaces of one or more of the selected element(s) on which the driving assistance markings generated for the road segment are to be painted. In particular, the road markings engine 220 may analyze the image(s) of the road segment to identify a color of the surface(s) of the selected element(s) and more specifically to identify the spectral range of visible light reflected by the surface(s) of the selected element(s).

For example, assuming the road markings engine 220 selects a certain road surface section of the road segment for applying the driving assistance markings, the road markings engine 220 may identify that the road surface section is a black asphalt surface which accordingly reflects visible light in a spectral range corresponding to black color. In another example, assuming the road markings engine 220 selects a certain road marking of the road segment for applying the driving assistance markings, the road markings engine 220 may identify that the road marking is painted white and thus reflects visible light in a spectral range corresponding to white color. In another example, assuming the road markings engine 220 selects a certain traffic pole of the road segment for applying the driving assistance markings, the road markings engine 220 may identify that the traffic pole is painted and/or coated with gray paint and thus reflects visible light in a spectral range corresponding to gray color.

As shown at 110, the road markings engine 220 may select one or more paint materials for applying (painting) the driving assistance markings generated for the road segment on the selected element(s) of the road segment.

Specifically, the road markings engine 220 may select infrared reflective paint material(s) which reflect infrared light in one or more infrared spectral ranges, for example, NIR (750-1400 nm), SWIR (1400-3000 nm) and/or the like and are further characterized by two main characteristics.

First, each of the selected paint materials may reflect light in the visible light spectral range which is substantially similar to the visible light spectral range of the surface(s) of the selected object(s) on which the driving assistance markings are to be applied. Specifically, each paint material selected for painting the driving assistance markings may deviate by less than a first value from the visible light spectral range reflected by the respective surface of the respective element. The first value, for example, 15%, 20%, 25% and/or the like may be set to ensure that the selected paint material(s) is not substantially visible in the visible light spectrum when painted on the selected element(s).

Second, each of the selected paint materials may reflect light in the infrared spectral range which is substantially different from the infrared spectral range of the surface(s) of the selected object(s) on which the driving assistance markings are to be applied. Specifically, each paint material selected for painting the driving assistance markings should deviate by more than a second value from the infrared spectral range reflected by the respective surface of the respective element. The second value, for example, 25%, 30%, 35% and/or the like may be set to ensure that the selected paint material(s) is substantially visible in the infrared light spectrum when painted on the selected element(s).

For brevity the paint material(s) selected for painting the driving assistance markings are designated infrared reflective paint materials. However, the deviation in the reflectance of infrared light may be to both directions, meaning that the paint material(s) selected for painting the driving assistance markings may be more infrared reflective or more absorptive compared to the surrounding background of the markings, i.e., the surface of the selected element(s) on which the markings are painted. As such, when the selected infrared reflective paint material(s) is more infrared reflective, the driving assistance markings will reflect more infrared light compared to their surrounding background and will be thus visible in the infrared spectrum range. Never the less, when the selected infrared reflective paint material(s) is more infrared absorptive (less infrared reflective), the driving assistance markings will reflect less infrared light compared to their surrounding background and will be also visible in the infrared spectrum range.

For example, assuming the road markings engine 220 selects a certain black asphalt road surface section of the road segment for applying the driving assistance markings. Further assuming that while the black asphalt road surface does not significantly reflect light in the visible light spectral range, the black asphalt road surface reflects infrared light in a spectral range of, for example, less than 800 nm. In such case the road markings engine 220 may select a paint material which does not deviate from the black asphalt color by more than, for example, 20% meaning that it does not reflect more than 20% of the visible light while significantly deviating, for example, by 25% from black asphalt color in the infrared spectral range, meaning that it reflects infrared light in a range of more than 1000 nm for example.

In another example, assuming the road markings engine 220 selects a certain white road marking of the road segment for applying the driving assistance markings. Further assuming that while the white road marking reflects most and possible all light in the visible light spectral range, the white road marking reflects infrared light in a spectral range of, for example, less than 950 nm. In such case the road markings engine 220 may select a paint material which does not deviate from the white road marking by more than, for example, 20% meaning that it reflects more that 80% of the visible light while significantly deviating, for example, by 25% from white road marking in the infrared spectral range, meaning that it reflects infrared light in a range of more than 1200 nm for example.

Figure 4:
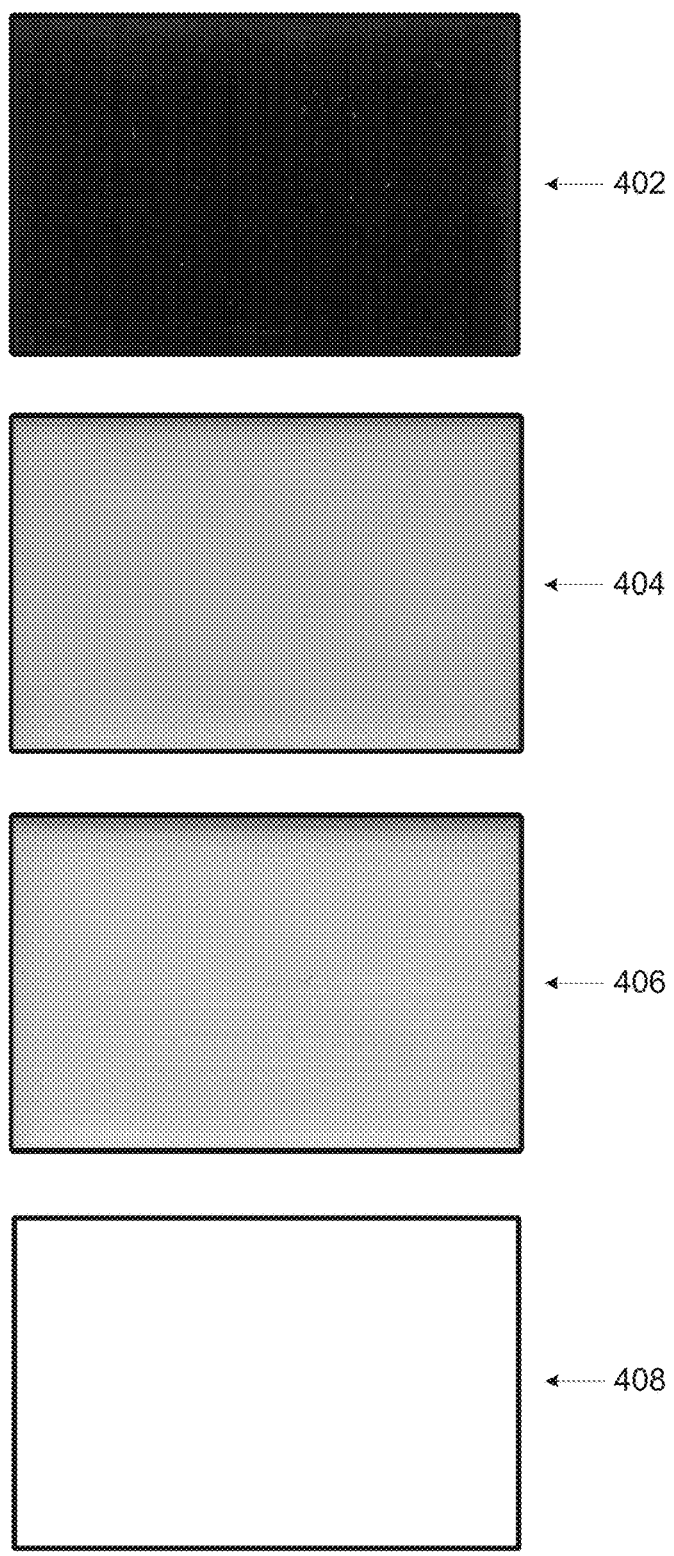
FIG. 4 presents color blends of an exemplary infrared reflective paint material(s) visible in the infrared spectrum while imperceptible in the visible light spectrum used for painting imperceptible driving assistance markings, according to some embodiments of the present invention.

Reference is now made to FIG. 4, presents color blends (mixtures) of an exemplary infrared reflective paint material(s) visible in the infrared spectrum while imperceptible in the visible light spectrum used for painting driving assistance markings, according to some embodiments of the present invention.

Assuming a road markings engine such as the road markings engine 220 selects a certain infrared reflective paint material seen in 402 which is characterized by a significantly dark color for painting driving assistance markings generated for a certain road segment. Further assuming the road markings engine 220 selects to paint the driving assistance markings on a certain element of the certain road segment which is characterized by a white color as seen in 408. In such case, the road markings engine 220 may determine that the certain infrared reflective paint material should be mixed with one or more other paint materials, for example, a white paint material to ensure that the certain infrared reflective paint material does not deviate from the color of the certain element painted white by more than the first value (e.g., 20%). The road markings engine 220 may compute one or more mixture ratios for mixing the certain infrared reflective paint material such that the color of the mixed infrared reflective paint material does not deviate by more than the first value form the white color of the surface of the certain element. A mixture at a ratio of 1:4 between the certain infrared reflective paint material and the white paint material is seen in 404 and a mixture at a ratio of 1:9 between the certain infrared reflective paint material and the white paint material is seen in 406.

As shown at 112, the road markings engine 220 may compute instructions for painting the driving assistance markings generated for the road segment on the selected element(s) using the selected paint material(s).

For example, the painting instructions may indicate a location, a position, an orientation, an elevation and/or the like for painting the driving assistance markings on the selected element(s). In another example, the painting instructions may indicate a size, a spacing and/or the like of the painted driving assistance markings.

Moreover, the painting instructions may define mixing one or more of the selected inferred reflective paint materials with one or more other paint materials and/or dilution substances to achieve and comply with the two characteristics of the paint material used to paint the driving assistance markings. Namely, these two characteristics, as described herein before, are deviation of less than the first value (e.g., 20%) from the visible light spectral range reflected by the surface of the respective element and deviation of more than the second value (e.g., 25%) from the infrared spectral range reflected by the surface of the respective element. The painting instructions may therefore define a concentration of each of the paint materials in the mixture, a volume of each paint materials in the mixture, one or more dilution materials and/or the like.

Optionally, the road markings engine 220 computes instructions for painting one or more of the driving assistance markings on the selected element(s) in close proximity, specifically closely around one or more visible road markings, for example, lane separator markings, road side border line markings, pedestrian crossings, painted direction symbols (e.g., arrows, stop lines, etc.), painted text (e.g. stop, slow, etc.) and/or the like. For example, the road markings engine 220 may compute instructions for painting one or more of the driving assistance markings next to lane separator lines markings. In another example, the road markings engine 220 may compute instructions for painting one or more of the driving assistance markings around one or more direction arrow markings. Painting the infrared visible driving assistance markings in proximity to the visible road markings may enable the automated vehicular systems to more easily detect, identify and/or recognize the infrared visible driving assistance markings. In particular, since the infrared visible driving assistance markings are located in proximity to the visible road markings, the automated vehicular systems may not erroneously interpret arbitrary infrared reflective materials and/or sections of the road segment as the infrared visible driving assistance markings.

The road markings engine 220 may compute the instructions for painting the driving assistance markings using the infrared reflective paint material(s) on existing painted surfaces of the selected element(s) of the road segment. For example, assuming there are lane separator line markings painted in at least part of the road segment, the road markings engine 220 may compute the instructions for painting the driving assistance markings using the infrared reflective paint material(s) on the existing lane separator line markings and/or part thereof. In another example, assuming there are one or more painted traffic poles and/or traffic light poles in the road segment, the road markings engine 220 may compute the instructions for painting the driving assistance markings using the infrared reflective paint material(s) on one or more of the painted poles.

However, the road markings engine 220 may compute the instructions for painting the driving assistance markings using the infrared reflective paint material(s) in conjunction with one or more other paint materials used to paint the surface(s) of the selected element(s). For example, the road markings engine 220 may compute instructions for painting one or more visible road markings, for example, lane separator lines, pedestrian crossing, direction symbols and/or the like using one or more visible light paint materials, for example, white paint. The road markings engine 220 may further compute instructions for using the infrared reflective paint material(s) to paint the driving assistance markings over one or more of the newly painted white road markings. In another example, the road markings engine 220 may compute instructions for painting one or more traffic poles located in the road segment using one or more visible light paint materials, for example, gray paint. The road markings engine 220 may further compute instructions for using the infrared reflective paint material(s) to paint the driving assistance markings over the one or more of the newly painted poles.

As shown at 114, the road markings engine 220 may output the painting instructions computed for painting the driving assistance markings on one or more of the elements of the road segment using one or more of the infrared visible paint materials The road markings engine 220 may output the painting instructions in one or more formats. For example, the painting instructions may be generated and configured accordingly to instruct one or more workers to manually apply the infrared visible paint(s). In another example, the painting instructions may be directed and configured accordingly for one or more automated painting systems, apparatuses and/or devices configured to apply automatically the infrared visible paint(s) to paint.

Figure 5:
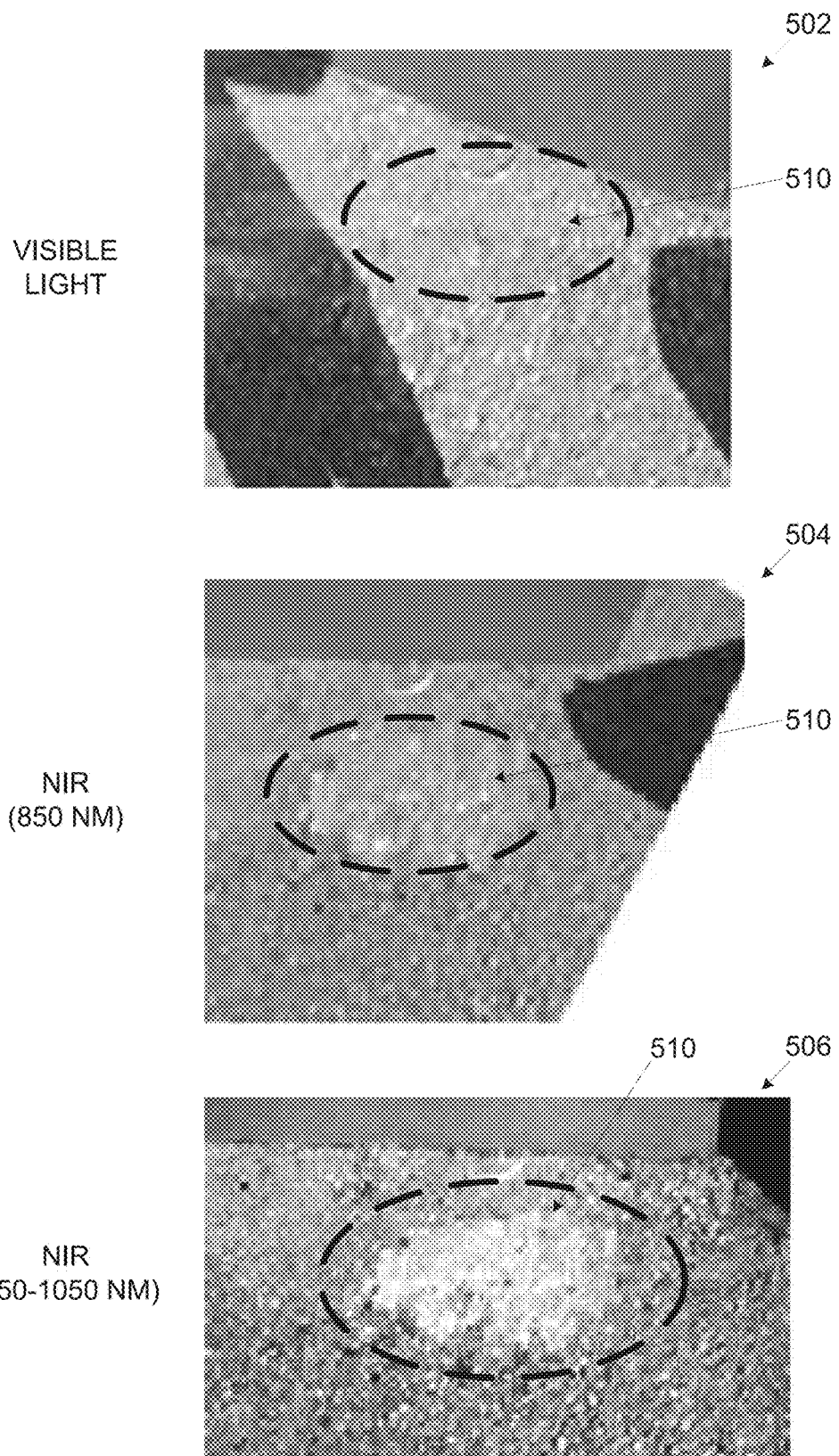
FIG. 5 presents images of a road section painted with an exemplary paint material(s) visible in the infrared spectrum while imperceptible in the visible light spectrum used for painting driving assistance markings, according to some embodiments of the present invention.

Reference is now made to FIG. 5, which presents images of a road section painted with an exemplary paint material(s) visible in the infrared spectrum while imperceptible in the visible light spectrum used for painting driving assistance markings, according to some embodiments of the present invention.

As seen in 502 which is an image of an exemplary certain road section captured in visible light spectral range, a certain mark 510 is almost imperceptible since it is painted using an exemplary infrared reflective paint material which does not significantly deviate from the color (visible light spectral range) of the certain road section.

As seen in 504, which is an image of the certain road section captured in NIR infrared spectral range, specifically at 850 nm, the certain mark 510 is slightly more visible since the exemplary infrared reflective paint material deviates to some extent from the infrared spectral range of the certain road section. However, the deviation may be insufficient, i.e., less than the second value (e.g. 25%) such that it may be significantly difficult to distinguish the certain mark 510 from its surrounding road section even in the 850 nm spectral range.

As seen in 506, which is an image of the certain road section captured in higher NIR infrared spectral range, specifically at 850-1050 nm, the certain mark 510 is highly visible since the exemplary infrared reflective paint material significantly deviates from the infrared spectral range of the certain road section, specifically by more than the second value (e.g. 25%).

According to some embodiments of the present invention the road markings generation system 200, specifically the road markings engine 220 may be integrated and/or executed by one or more painting systems, apparatuses and/or devices configured to apply automatically one or more of the infrared reflective paint materials for painting the infrared visible driving assistance markings on one or more elements in one or more road segments.

Such painting systems, apparatuses and/or devices, collectively designated automated painting systems herein after, may be equipped with one or more paint applying elements as known in the art, for example, a sprayer, a brush, a dispenser and/or the like which are controllable by one or more controllers and/or processors of the automated painting systems.

The road markings engine 220 executed by one or more of the automated painting systems may therefore execute the process 100 to compute the instructions for painting the driving assistance markings generated for one or more road segments on one or more elements of the respective road segments using one or more of the infrared reflective paint materials.

Specifically, one or more of the automated painting systems may be equipped with one or more imaging sensors, for example, a camera, infrared camera, a thermal camera and/or the like configured to capture one or more images of the road segment(s) in particular of one or more of the elements of the road segment(s). The road markings engine 220 may analyze the images, specifically the elements' surface(s) to identify their color and select the infrared reflective paint material(s) accordingly as described in the process 100.

After computing the painting instructions, the road markings engine 220 may operate one or more of the paint applying elements of the respective automated paining system to automatically apply the infrared reflective paint materials in order to paint the infrared visible driving assistance markings. In other embodiments, the road markings engine 220 may provide the painting instructions to one or more other functional modules (e.g. software module, hardware element and/or a combination thereof) executed by the automated painting system.

Optionally, one or more of the automated paining systems may be further configured to apply visible paint to paint road markings using one or more visible paint materials which are visible in the visible light spectrum. Such automated paining systems may optionally paint the infrared visible driving assistance markings using the selected infrared reflective paint material(s) while painting the visible road markings using the visible paint material(s).

According to some embodiments of the present invention, the road markings generation system 200, specifically the road markings engine 220 may be configured to compute instructions for painting road markings, specifically background patterns on one or more surfaces of one or more road segments which are highly visible in one or more infrared light spectral ranges while highly imperceptible in the visible light spectrum.

The background patterns are painted to support object detection, specifically, detection of dynamic objects, for example, vehicles, pedestrians and/or the like which may move in the road segments and thus cross surfaces of the road segments on which the background patters may be painted, for example, a road surface, a sidewalk surface and/or one or more surfaces of practically any other transportation infrastructure object such as, for example, traffic signs, road signs, poles, barrier rails, bridges and/or the like.

The background patterns may be painted such that, in the visible light spectral range, the background patterns may significantly blend with their background, i.e. the surfaces on which they are painted thus making them significantly imperceptible by the human eye and thus invisible to human drivers and/or visible light based automated systems. However, in one or more of the infrared light spectral ranges, for example, NIR, SWIR and/or the like, the background patterns may be highly visible over the painted surfaces as they may reflect infrared light very differently from the infrared reflection characteristics of the surfaces.

Moreover, the infrared light reflected by the background patterns may be also very different from the infrared light reflected by the dynamic objects. Therefore, when crossing the background patterns and located in front of them, the dynamic objects may be highly detectable in the infrared spectral range(s) as the infrared light they reflect may be easily distinguish them from the background patterns.

The road markings engine 220 may execute a process similar to the process 100 to paint the background patterns on one or more surfaces of one or more road segments. However, the road markings engine 220 may execute the process 100 with some adjustments. First, in step 104, the road markings engine 220 may compute background patterns estimated to best support efficient detection of dynamic objects moving in the road segment. Moreover, in step 106, the road markings engine 220 may typically select surfaces which are estimated to be crossed by one or more of the dynamic objects such that the dynamic objects may be detected when located in front of one or more of the background patterns.

Furthermore, in step 110, the road markings engine 220 may optionally select multiple paint materials which reflect significantly different light levels in one or more of the infrared spectral ranges, for example, NIR, SWIR and/or the like while in the visible light spectral range they may reflect light which deviates by less than a certain value from the light reflected by the selected surface. This may serve to paint background patterns which may alternate in the infrared light reflection such that even if one or more of the dynamic objects reflect infrared light which does not significantly deviate from the infrared light reflected by background pattern(s) painted with one of the paint materials this dynamic object(s) may be highly detectable when located (crossing) in front of background pattern(s) painted with one or more other paint materials having different infrared reflection characteristics.

Optionally, the road markings engine 220 may select one or more paint material which are at least partially and typically highly transparent in one or more of the infrared spectral ranges, for example, NIR, SWIR and/or the like while reflecting light in the visible light range which does not significantly deviates from the light reflected by the surfaces(s) selected for painting the background pattern(s). This means that in the visible light range, the selected paint material(s) may reflect light which deviates by less than the first value from the visible light reflected by the surface(s). However, in the infrared spectral range(s) (e.g. NIR, SWIR), the selected paint material(s) may transfer more than a fourth value of light, for example, 80%, 85, %, 90%, 95% and/or the like.

One or more of the background patterns may be painted on the selected surface(s) which may be further painted using the at least partially infrared transparent paint material(s) such that background pattern(s) are painted beneath the at least partially infrared transparent paint material(s). The background pattern(s) may be painted using one or more paint materials visible in one or more spectral ranges, for example, the visible light spectrum, the NIR spectral range, the SWIR spectral range and/or the like. As such, in the infrared spectral range(s) the overlaying at least partially infrared transparent paint material may be transparent thus exposing the background pattern(s) painted on the selected surface(s) beneath the at least partially infrared transparent paint material.

As describe in the process 100, in step 102, the road markings engine 220 may receive one or more images of the road segment.

In step 104, the road markings engine 220 may generate one or more background patterns for the road segment. In particular, the road markings engine 220 may create, based on analysis of the image(s), one or more background patterns estimated to best support detection of one or more dynamic objects, for example, a vehicle, a pedestrian and/or the like while crossing he backgrounds patterns.

The background patterns generated by the road markings engine 220 may include, one or more patterns, symbols and/or the like which may have one or more shapes, dimensions (e.g. length, width, etc.) which are estimated to best support detection of one or more dynamic objects, for example, a vehicle, a pedestrian and/or the like while crossing he backgrounds patterns.

In step 106, the road markings engine 220 may analyze the image(s) of the road segment to identify and select one or more surfaces, for example, a road surface, a sidewalk surface and/or a surface of one or more other transportation infrastructure objects, for example, a traffic sign, a road sign, a pole, a barrier rail, a bridges and/or the like on which the background pattern(s) are to be applied (painted).

In step 108, the road markings engine 220 may analyze the selected surface(s) on which the background pattern(s) generated for the road segment are to be painted. In particular, the road markings engine 220 may analyze the image(s) of the road segment to identify a color of the selected surface(s) and more specifically to identify the spectral range of visible light reflected by the selected surface(s), for example, visible light corresponding to black color, gray color, white color, blue color, red color and/or the like.

In step 110, the road markings engine 220 may select one or more paint materials for painting the background pattern(s) generated for the road segment on the selected surface(s) of the road segment.

The background pattern(s) are directed to support one or more object detection systems configured to monitor traffic, vehicles, pedestrians and/or the like, for example, a speed control system, a traffic offenses detection systems, a pedestrian safety system and/or the like which are capable of operating in the infrared spectrum. These object detection system(s), which are typically automated systems, may integrate, employ, connect and/or communicate with one or more imaging sensors, for example, a camera, an infrared camera, a thermal mapping camera, a LiDAR sensor and/or the like configured to capture images of the road segment in one or more of the infrared spectral ranges, for example, NIR, SWIR and/or the like.

Therefore, for painting the background pattern(s) the road markings engine 220 may select paint one or more paint materials which reflect (or absorb) infrared light in one or more of the infrared spectral ranges. However, while the selected paint material(s) are characterized by reflecting and/or absorbing significant light in the infrared light spectral range(s), these paint materials are also characterized by reflecting light, in visible light spectral range, which is substantially similar to the light reflected by the selected surface on which the background pattern(s) are to be painted.

In the visible light range, the selected paint material(s) may therefore reflect light deviating by less than a first value from the light reflected by the selected surface(s). The first value, for example, 15%, 20%, 25% and/or the like may be set to ensure that the background pattern(s) painted using the selected paint material(s) blends with the surface and is thus substantially imperceptible (invisible) in the visible light spectrum.

Complementary, the selected paint material(s) may reflect infrared light, in one or more of the infrared spectral ranges, which is substantially different from the infrared light reflected by the selected surface(s). Specifically, each selected paint material may deviate by more than a second value from the infrared spectral range reflected by the selected surface(s). The second value, for example, 20%, 25%, 30% and/or the like may be set to ensure that the background pattern(s) painted using the selected paint material(s) is substantially distinguishable from the selected surface(s) and is thus perceptible (visible) in the infrared light spectral range(s).

Optionally, a plurality of paint materials may be selected to paint a plurality of alternating background patterns, for example, two, three and/or the like such that different background patterns, typically adjacent background patterns are painted using different paint materials having very different infrared reflection characteristics. The light reflected by each selected paint material in one or more of the infrared spectral ranges may therefore deviate by more than a third value from the infrared light reflected by any of the other selected paint materials, for example, 20%, 25%, 30% and/or the like.

Painting the alternating background patterns may increase detection performance, for example, accuracy, reliability, robustness and/or the like of one or more of the object detection systems since even if one or more of the dynamic objects reflect infrared light which does not significantly deviate from the infrared light reflected by the background pattern(s) painted using a selected first paint material, the infrared light reflected by the dynamic object(s) may significantly deviate from the infrared light reflected by the background pattern(s) painted using a selected second paint material which is different in its infrared reflection characteristics from the first paint material, specifically by the third value.

Figure 6A:
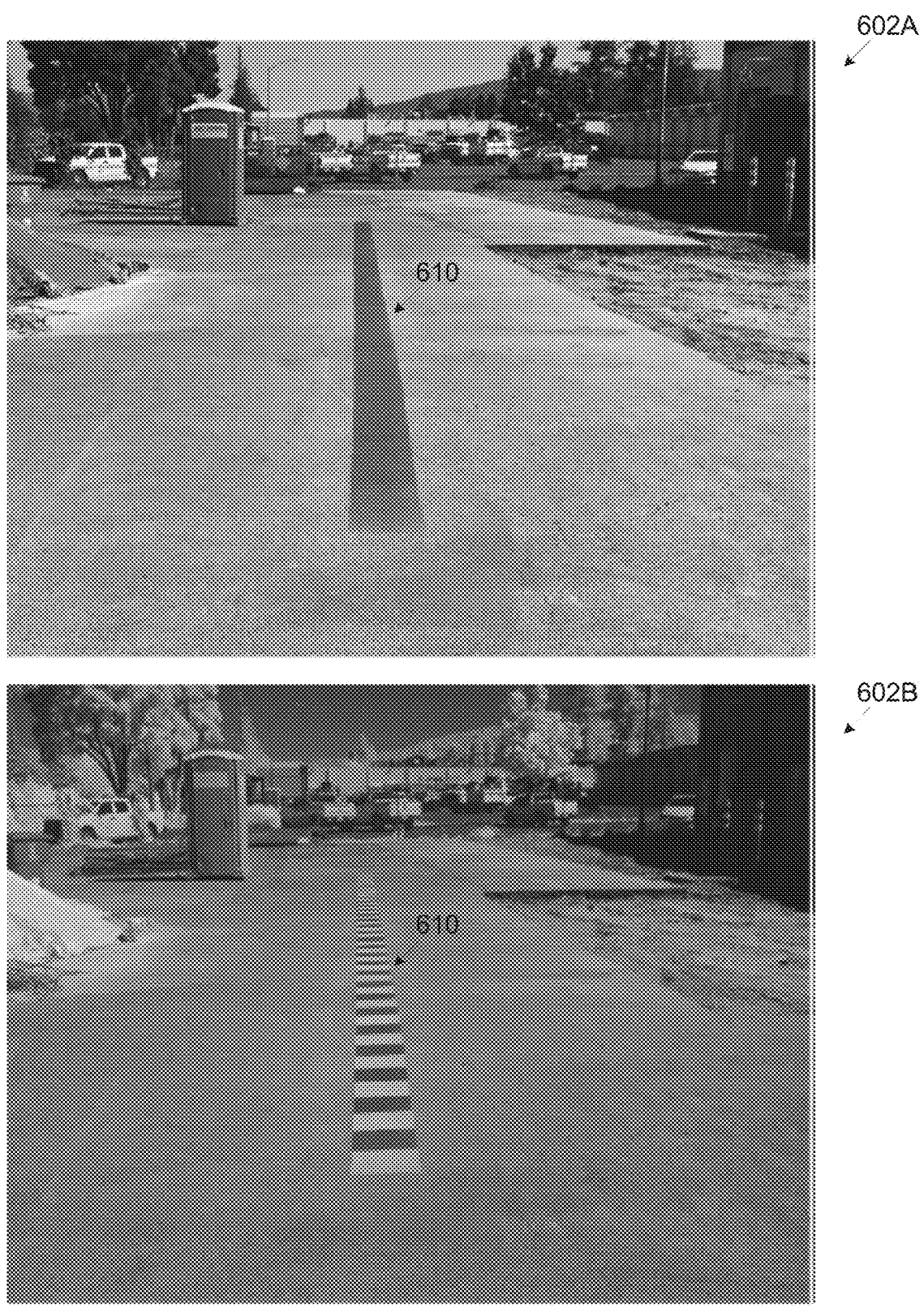
FIG. 6A and FIG. 6B illustrate exemplary road markings painted using paint material(s) visible in the infrared spectrum while imperceptible in the visible light spectrum used for painting additional road markings, according to some embodiments of the present invention.
Figure 6B:
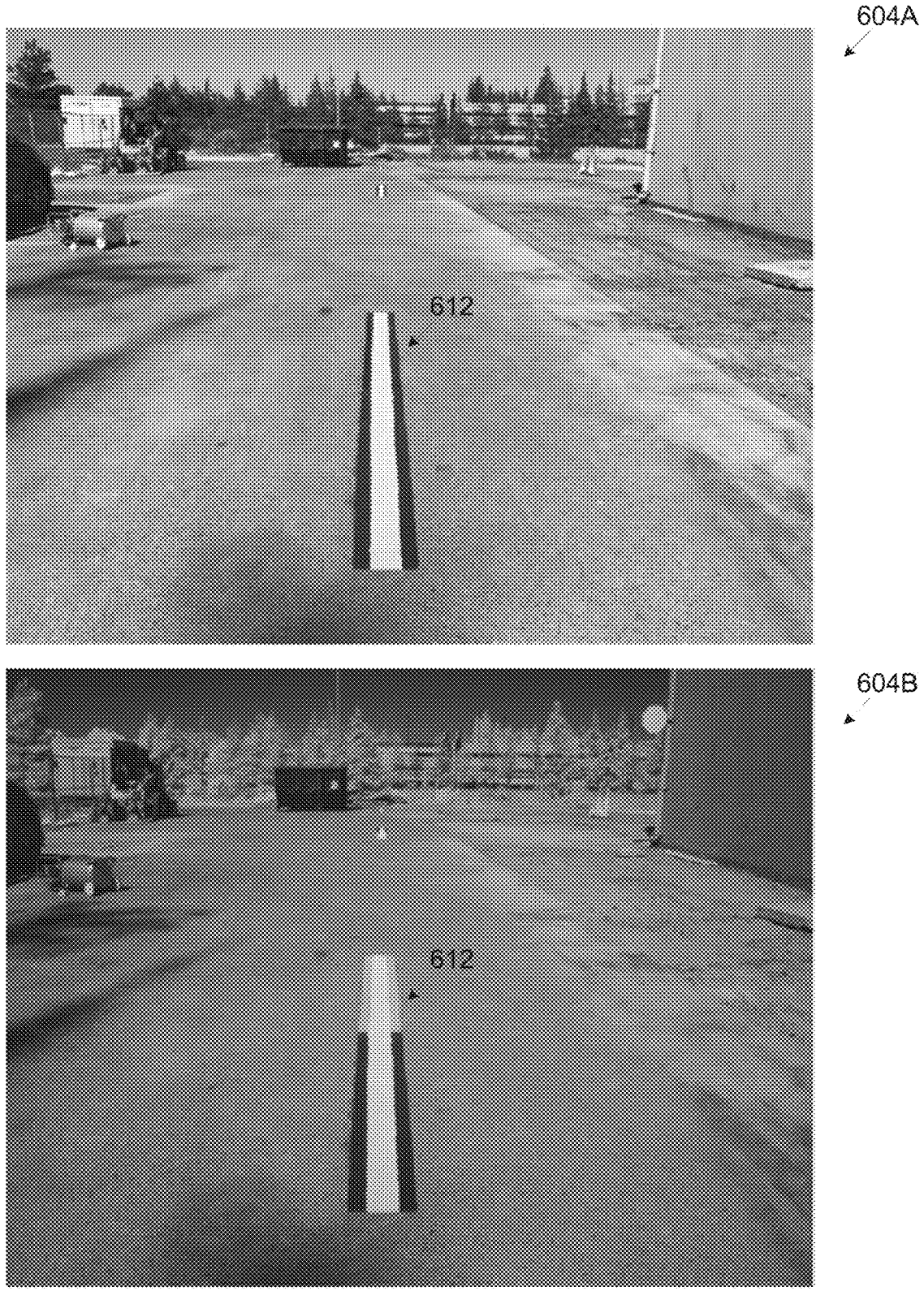

Reference is now made to FIG. 6A and FIG. 6B, which illustrate exemplary road markings painted using paint material(s) visible in the infrared spectrum while imperceptible in the visible light spectrum used for painting additional road markings, according to some embodiments of the present invention.

As seen in FIG. 6A, an image 602A presents a certain pattern 610 painted on a road surface as captured in the visible light spectral range while an image 602B presents the same pattern 610 captured in an infrared spectral range, for example, NIR. As evident in the image 602A, the pattern 610 substantially blends with the background road surface as it may reflect visible light deviating by less than the first value from the visible light reflected by the road surface. However, as seen in the image 602B, the infrared light reflected by the pattern 610 in the infrared spectral range significantly deviates from the infrared light reflected by the road surface, specifically by the second value and is therefore highly distinguishable from the road surface.

Moreover, as seen in image 602B, the pattern 610 is painted using two infrared reflective paint materials which significantly deviate in their infrared reflection characteristics, specifically by the third value and are therefore highly distinguishable from each other forming an alternating background pattern comprising infrared light high reflection sections (brighter) and infrared light low reflection sections (darker).

As seen in FIG. 6B, an image 604A presents a certain pattern 612 painted on a road surface as captured in the visible light spectral range while an image 604B presents the same pattern 612 captured in an infrared spectral range, for example, NIR.

As seen in the image 604A, in the visible light spectrum tow outer lines of the pattern 612 seem the same as they are painted using paint materials which in the visible light may reflect substantially the same light range (color). However, as seen in the image 604B, in the infrared spectral range, the further section of the outer lines of the pattern 612 seem significantly brighter compared to the closer section of the outer lines of the pattern 612 which seem much darker. This is because the further and closer sections of the outer line o of the pattern 612 are painted using two different infrared reflective paint materials which significantly deviate in their infrared reflection characteristics, specifically by the third value and are therefore highly distinguishable from each other.

In step 112, the road markings engine 220 may compute instructions for painting the background pattern(s) generated for the road segment on the selected surfaces of the road segment.

For example, the painting instructions may indicate a location, a position, an orientation, an elevation and/or the like for painting the background pattern(s) on the selected surface(s). In another example, the painting instructions may indicate a size, a spacing and/or the like of the painted background pattern(s).

Moreover, the painting instructions may define mixing one or more of the selected inferred reflective paint materials with one or more other paint materials and/or dilution substances to achieve and comply with the two characteristics of the paint material used to paint the driving assistance markings. Namely, deviation of less than the first value (e.g., 20%) from the visible light spectral range reflected by the selected surface(s) and deviation of more than the second value (e.g., 25%) from the infrared spectral range reflected by the selected surface(s) of the respective element. The painting instructions may therefore define a concentration of each of the paint materials in the mixture, a volume of each paint materials in the mixture, one or more dilution materials and/or the like.

The road markings engine 220 may optionally compute instructions for painting the driving assistance markings using the infrared reflective paint material(s) on one or more already painted selected surfaces of the road segment. For example, assuming there are lane separator line markings painted on a road surface in at least part of the road segment, the road markings engine 220 may compute instructions for painting the background pattern(s) using the infrared reflective paint material(s) on the existing lane separator line markings and/or part thereof.

Moreover, the road markings engine 220 may compute the instructions for painting the background pattern(s) using the infrared reflective paint material(s) in conjunction with one or more other paint materials used to paint the selected surface(s). For example, the road markings engine 220 may compute instructions for painting one or more visible road markings, for example, lane shoulder lines, pedestrian crossing, direction symbols and/or the like using one or more visible light paint materials, for example, white paint. The road markings engine 220 may further compute instructions for using the infrared reflective paint material(s) to paint the background pattern(s) over one or more of the newly painted white road markings.

In step 114, the road markings engine 220 may output the painting instructions computed for painting the background pattern(s) on one or more of the selected surfaces of the road segment using one or more of the selected infrared reflective paint materials.

Figure 7A:
FIG. 7A and FIG. 7B present exemplary background patterns painted in an exemplary road segment using paint material(s) visible in the infrared spectrum while imperceptible in the visible light spectrum, according to some embodiments of the present invention.
Figure 7B:

Reference is now made to FIG. 7A and FIG. 7B, which present exemplary background patterns painted in an exemplary road segment using paint material(s) visible in the infrared spectrum while imperceptible in the visible light spectrum, according to some embodiments of the present invention;

FIG. 7A is an image of a certain road segment 702 captured in the visible light spectral range while FIG. 7B is an image of the 602B presents the same road segment 702 captured in an infrared spectral range, for example, NIR.

As seen in the image in FIG. 7B, a plurality of background patterns 710, for example, background patterns 710A, 710B, 710C, 710D, 710E and 710F which are painted on the road surface of the road segment 702 using infrared reflective paint materials are highly visible in the infrared spectral range. However, as seen in the image in FIG. 7A, the background patterns 710A, 710B, 710C, 710D, 710E and 710F blend with the background road surface 702 and are thus highly imperceptible (and practically invisible) in the visible light spectral range.

Moreover, the background patterns 710 are painted using two distinct infrared reflective paint materials which reflect infrared light deviating by more than the third value compared to each other such alternating background patterns 710 are significantly distinguishable from each other. For example, the background patterns 710A, 710C and 710E painted using a first high infrared light reflection paint material seem much brighter compared to the background patterns 710B, 710D and 710F painted using a second low infrared light reflection paint material (infrared absorptive material) which appears much darker.

According to some embodiments of the present invention, one or more of the object detection systems may be configured to detect traffic of one or more of the dynamic objects, for example, a vehicle, a pedestrian and/or the like crossing and thus located in front of background patterns painted on one or more surfaces of one or more road segments.

Figure 8:
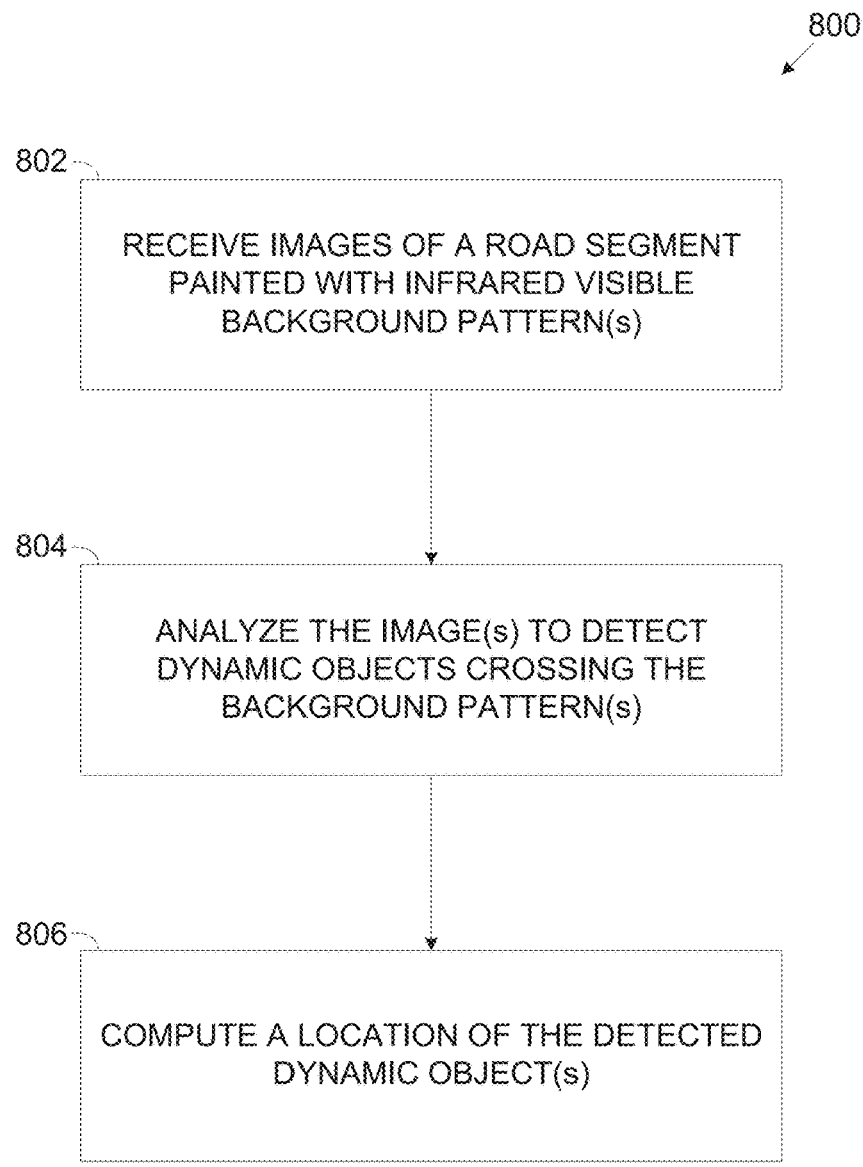
FIG. 8 is a flowchart of an exemplary process of detecting dynamic objects crossing background patterns painted using infrared reflective paint material(s), according to some embodiments of the present invention.
Figure 9:
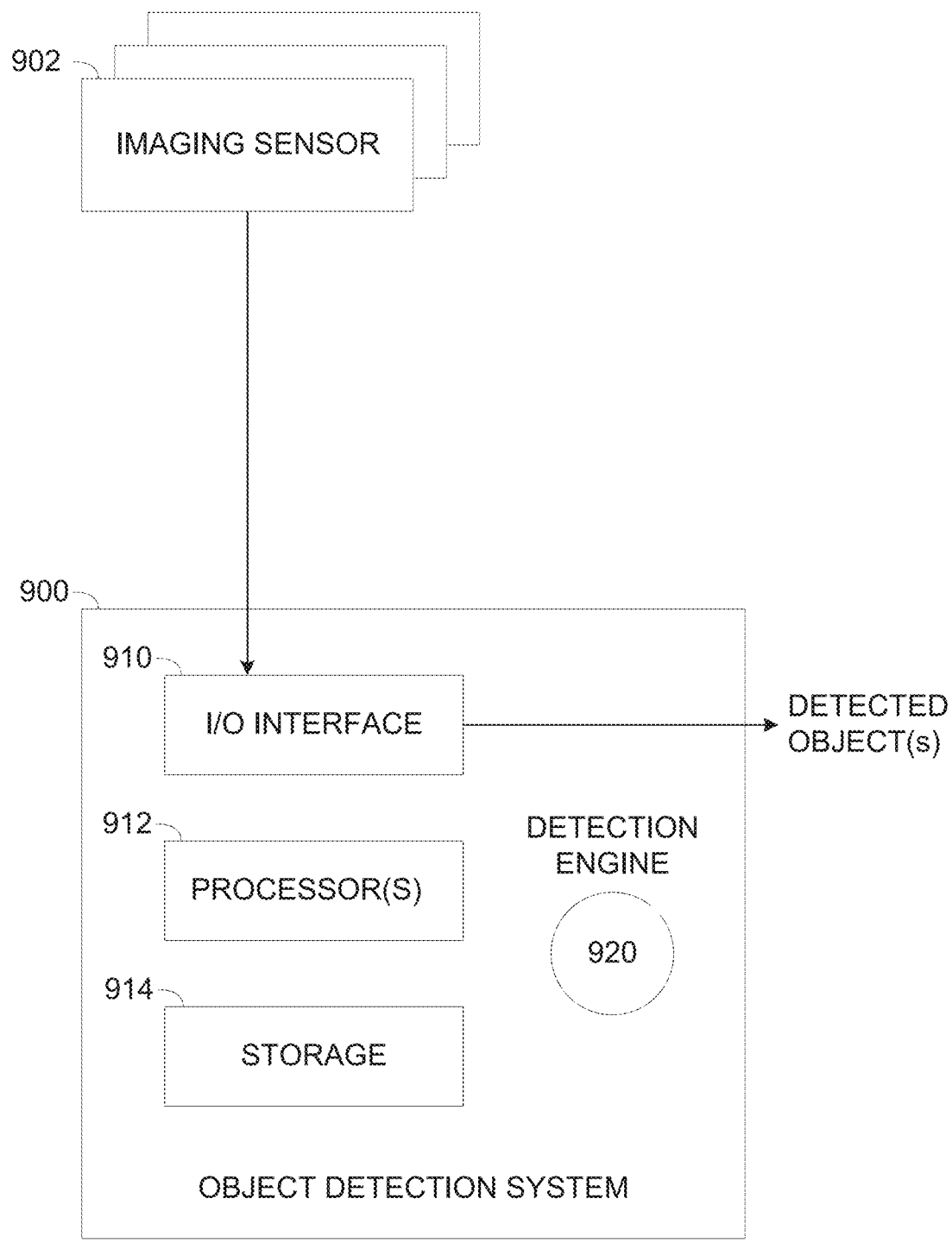
FIG. 9 is a schematic illustration of an exemplary system for detecting dynamic objects crossing background patterns painted using infrared reflective paint material(s), according to some embodiments of the present invention.

Reference is now made to FIG. 8, which is a flowchart of an exemplary process of detecting dynamic objects crossing background patterns painted using infrared reflective paint material(s), according to some embodiments of the present invention. Reference is also made to FIG. 9, which is a schematic illustration of an exemplary system for detecting dynamic objects crossing background patterns painted using infrared reflective paint material(s), according to some embodiments of the present invention.

An object detection system, device, apparatus and/or the like collectively designated object detection system 900 may be configured to execute an exemplary process 800 to detect one or more dynamic objects in one or more road segments, specifically road segments painted with one or more background patterns which are highly visible in the infrared spectral range(s) while highly imperceptible in the visible light spectral range.

The object detection system 900 may include an I/O interface 910 such as the I/O interface 210, a processor(s) 912 such as the processor(s) 212 for executing the process 800 and a storage 914 such as the storage 214 for storing data and/or code (program store).

Via the I/O interface 910, interface comprising one or more network interfaces and/or interconnection interfaces, the object detection system 900 may connect and/or communicate with one or more other systems, devices and/or services which may be local and/or remote, for example, a remote server, a cloud service, a cloud platform and/or the like.

Specifically, via the I/O interface 910, the object detection system 900 may communicate with one or more imagining sensors 902 deployed and configured to monitor and capture images of the road segment. The imaging sensors 902 may include, for example, the camera, the infrared camera, the thermal mapping camera and/or the like configured to capture images of the vehicle's surroundings in one or more of the infrared spectral ranges, for example, NIR, SWIR and/or the like.

The processor(s) 912 may execute one or more software modules such as, for example, a process, a script, an application, an agent, a utility, a tool, an OS and/or the like each comprising a plurality of program instructions stored in a non-transitory medium (program store) such as the storage 914 and executed by one or more processors such as the processor(s) 912. The processor(s) 912 may optionally, integrate, utilize and/or facilitate one or more hardware elements (modules) integrated and/or utilized in the road markings generation system 200, for example, a circuit, a component, an IC, an ASIC, an FPGA, a DSP, a GPU and/or the like.

The processor(s) 912 may therefore execute one or more functional modules implemented using one or more software modules, one or more of the hardware modules and/or combination thereof. For example, the processor(s) 912 may execute a detection engine 920 functional module configured to execute the process 800 for detecting dynamic objects in the road segment painted with one or more background patterns highly visible in the infrared spectral range(s) while highly imperceptible in the visible light spectral range.

Optionally, the object detection system 900, specifically the detection engine 920 are provided and/or utilized by one or more cloud computing services, for example, IaaS, PaaS, SaaS and/or the like provided by one or more cloud infrastructures, platforms and/or services such as, for example, Amazon AWS, Google Cloud, Microsoft Azure and/or the like. In such deployments, the detection engine 920 may communicate with the imaging sensor 902 via one or more networks to receive images of the road segment captured by the imaging sensors 902.

As shown at 802, the object detection system 900, specifically the detection engine 920 may receive one or more images of the road segment captured by the imaging sensor(s) 902.

Since the imaging sensor(s) 902 are configured to operate in the infrared spectral range(s) (e.g. NIR, SWIR, etc.), the received images may depict the road segment and hence the background pattern(s) painted on one or more surfaces of the road segment in one or more of the infrared spectral ranges.

Each of the imaging sensor(s) 902 may be typically deployed elevated above ground level such that its Field of View (FOV) may include a significant portion of the road segment stretching away from a location of the respective imaging sensor 902. The images captured by the imaging sensor(s) 902 may therefore capture a significant portion of road segment potentially to far distance from the imaging sensor(s) 902.

As shown at 804, the detection engine 920 may analyze the image(s) depicting at least part of the road segment painted with one or more background patterns to identify one or more dynamic objects, for example, a vehicle, a pedestrian and/or the like moving in the road segment.

In particular, the detection engine 920 may analyze the image(s) to identify one or more dynamic objects which cross one or more of the background pattern(s) painted in the road segment such that the crossing dynamic object(s) and/or part thereof is located in front of one or more of the background pattern(s) painted on one or more surfaces of the road segment.

The detection engine 920 may analyze the image(s) using one or more methods, techniques and/or algorithms as known in the art, for example, computer vision, image processing, classification functions (classifiers), machine learning models and/or the like.

As described herein before, the background patterns may be painted using a plurality of paint materials reflecting infrared light which significantly deviates from one paint material to another. The detection engine 920 may therefore detect one or more dynamic objects reflecting infrared light which is substantially similar to the infrared light reflected by one of the paint materials used to one or more of the background patterns. In particular, the detection engine 920 may detect such dynamic object(s) while located in front of other background pattern(s) painted using another paint material reflecting infrared light significantly deviating from the infrared light reflected by the dynamic object(s).

For example, assuming detection engine 920 analyzes image(s) depicting the road surface 702 painted with the background patterns 701A, 701B, 710C, 710D, 710E and 710F. Further assuming that a certain dynamic object, for example, a car moving on the road surface 702 towards the imaging sensor 902 which captured the image 7B reflects infrared light which is very similar to the infrared light reflected by some of the background patterns, for example, the bright background patterns 710A, 710C and 710E. In such case, the detection engine 920 may fail to detect the car while crossing the bright background patterns 710A, 710C and 710E. However, the detection engine 920 may detect the car while crossing the dark background patterns 710B, 710D and/or 710F since the light reflected by the dark background patterns 710B, 710D and/or 710F in the infrared spectral range(s) deviates by more than the third value from the inferred light reflected by the bright background patterns 710A, 710C and 710E and hence also from the inferred light reflected by the crossing car. The detection engine 920 may therefore easily detect the car while highly visible in the inferred spectral range(s) compared to its background dark background patterns 710B, 710D and/or 710F.

As shown at 806, the detection engine 920 may compute a location of each identified dynamic object.

The physical position of the imaging sensor(s) 902, for example, location, elevation and/or the like may be known. One or more image capturing parameters of the imaging sensor(s) 902 may be also known, for example, resolution, pixel size and/or the like. The detection engine 920 may therefore derive real world dimensions, location and/or position based on pixel conversion of the captured images as known in the art.

Therefore, based on the analysis of the image(s) depicting one or more dynamic images located in front of one or more of the background pattern(s) painted on one or more surfaces of the road segment and further based on the conversion ratio, the detection engine 920 may compute the real-world location of each detected dynamic object.

Optionally, the detection engine 920 may further compute one or more attributes of one or more of the detected dynamic objects, for example, one or more dimensions such as, for example, size, length, width, height and/or the like, speed, acceleration direction of movement (movement vector) and/or the like. To this end, the detection engine 920 may apply image analysis, computation and conversion of pixel size to real-world dimensions based on the known location, position, orientation and/or of the imaging sensor(s) coupled with their image capturing parameters as known in the art.

According to some embodiments of the present invention, there are provided methods, systems and computer program products for computing instructions for painting, in one or more road segments, reference markings which are highly perceptible (visible) in one or more of the infrared spectral ranges, for example, NIR, SWIR and/or the like while highly imperceptible (invisible) in the visible light spectral range.

The reference markings which may be painted on one or more surfaces of the road segment(s) are directed to support calibration of one or more imaging sensors such as the imaging sensor 902 deployed to capture imagery data of the road segments that are later used by the object detection system(s) 900. The reference markings which may be also painted with respect to one or more elements of the road segment, for example, intersection entry/exit points, lane separators, stop lines, pedestrian crossings and/or the like. The reference markings may further include and/or encode an identifier of the road segment which may include, for example, identification data of the road segment, a type of the road segment, a location of the road segment, (e.g. longitude, latitude, altitude, etc.) and/or the like.

These reference markings may be used by one or more object detection systems such as the object detection system 900, for example, a traffic monitoring systems such as, for example, a traffic control system, a vehicle speeding detection system, a red-light crossing detection system and/or the like to improve their detection of the elements marked by the reference markings.

The road markings engine 220 may execute a process similar to the process 100 to paint the reference markings on one or more surfaces of one or more road segments with some adjustments. First, the step 102 is optional. While the road markings engine 220 may receive images and analyze them to automatically identify where to place the reference markings in the road segment, the markings engine 220 receive instructions, for example, from an expert user for the locations at which the reference markings are to be painted. In step 104, the road markings engine 220 may compute reference markings estimated to best support efficient calibration of the imaging sensor(s) 902 deployed to monitor the road segment and/or of elements of value to the traffic monitoring system(s) deployed to monitor the road segment.

As describe in the process 100, in step 102, the road markings engine 220 may receive one or more images of the road segment.

In step 104, the road markings engine 220 may generate one or more reference markings for the road segment which may follow one or more patterns, symbols and/or the like having one or more shapes, dimensions (e.g. length, width, etc.) estimated by the road markings engine 220 based on analysis of the image(s) to best support calibration of the imaging sensor(s) 902 and/or the traffic monitoring system(s) deployed to monitor the road segment.

In step 106, the road markings engine 220 may analyze the image(s) of the road segment to identify and select one or more surfaces, for example, a road surface, a sidewalk surface and/or a surface of one or more other transportation infrastructure objects, for example, a traffic sign, a road sign, a pole, a barrier rail, a bridges and/or the like on which the reference markings are to be applied (painted).

In step 108, the road markings engine 220 may analyze the selected surface(s) on which the reference markings generated for the road segment are to be painted. In particular, the road markings engine 220 may analyze the image(s) of the road segment to identify a color of the selected surface(s) and more specifically to identify the spectral range of visible light reflected by the selected surface(s), for example, visible light corresponding to black color, gray color, white color, blue color, red color and/or the like.

In step 110, the road markings engine 220 may select one or more paint materials for painting the reference markings generated for the road segment on the selected surface(s) of the road segment.

The reference markings are directed to support calibration of imaging sensor(s) 902 and/or detection capabilities of one or one or more object detection systems such as the object detection system 900 configured to monitor traffic, vehicles, pedestrians and/or the like, for example, a speed control system, a traffic offenses detection systems, a pedestrian safety system and/or the like. Specifically, the reference markings are directed to support imaging sensor(s) 902 and traffic control system(s) 900 which are capable of operating in one or more of the infrared spectral ranges, for example, NIR, SWIR and/or the like.

Therefore, for painting the reference markings the road markings engine 220 may select paint one or more paint materials which reflect (or absorb) infrared light in one or more of the infrared spectral ranges. However, while the selected paint material(s) are characterized by reflecting and/or absorbing significant light in the infrared light spectral range(s), these paint materials are also characterized by reflecting light, in visible light spectral range, which is substantially similar to the light reflected by the selected surface on which the reference markings are to be painted.

In the visible light range, the selected paint material(s) may therefore reflect light deviating by less than a first value from the visible light spectral range reflected by the selected surface(s). The first value, for example, 15%, 20%, 25% and/or the like may be set to ensure that the reference markings painted using the selected paint material(s) blends with the surface and is thus substantially imperceptible (invisible) in the visible light spectrum.

Complementary, the selected paint material(s) may reflect light in one or more of the infrared spectral ranges which is substantially different from the infrared spectral range reflected by the selected surface(s). Specifically, each selected paint material may deviate by more than a second value from the infrared spectral range reflected by the selected surface(s). The second value, for example, 20%, 25%, 30% and/or the like may be set to ensure that the reference markings painted using the selected paint material(s) is substantially distinguishable from the selected surface(s) and is thus perceptible (visible) in the infrared light spectral range(s).

Optionally, a plurality of paint materials may be selected to paint the reference markings, for example, two, three and/or the like each having different infrared reflection characteristics.

Optionally, the road markings engine 220 may select one or more of the at least partially infrared transparent paint materials which are at least partially and typically highly transparent in the infrared spectral range(s) (e.g. NIR, SWIR, etc.) while reflecting light in the visible light range which does not significantly deviates from the light reflected by the surfaces(s) selected for painting the reference markings. As such, in the visible light range, the selected paint material(s) may reflect light which deviates by less than the first value from the visible light reflected by the selected surface(s) while in the infrared spectral range(s), the selected paint material(s) may transfer more than the fourth value of (infrared) light.

One or more of the reference markings may be therefore painted on the selected surface(s) which may be further painted using the at least partially infrared transparent paint material(s) such that reference markings are painted beneath the at least partially infrared transparent paint material(s). The reference markings may be painted using one or more paint materials visible in one or more spectral ranges, for example, the visible light spectrum, the NIR spectral range, the SWIR spectral range and/or the like. In the infrared spectral range(s) the overlaying at least partially infrared transparent paint material may become transparent thus exposing the reference markings painted on the selected surface(s) beneath the at least partially infrared transparent paint material.

In step 112, the road markings engine 220 may compute instructions for painting the reference markings generated for the road segment on the selected surfaces of the road segment.

For example, the painting instructions may indicate a location, a position, an orientation and/or the like for painting the reference markings on the selected surface(s). In another example, the painting instructions may indicate a size, a spacing and/or the like of the painted reference markings.

Moreover, the painting instructions may define mixing one or more of the selected inferred reflective paint materials with one or more other paint materials and/or dilution substances to achieve and comply with the two characteristics of the paint material used to paint the driving assistance markings. The road markings engine 220 may optionally compute instructions for painting the driving assistance markings using the infrared reflective paint material(s) on one or more already painted selected surfaces of the road segment. Moreover, the road markings engine 220 may compute the instructions for painting the background pattern(s) using the infrared reflective paint material(s) in conjunction with one or more other paint materials used to paint the selected surface(s).

In step 114, the road markings engine 220 may output the painting instructions computed for painting the reference markings on one or more of the selected surfaces of the road segment using one or more of the selected infrared reflective paint materials.

One or more traffic monitoring systems which may use and object detection system such as the object detection system 900 may use the reference markings painted in one or more road segments. For example, one or more imaging sensor 902 used by the object detection system 900 may be calibrated according to one or more of the reference markings. In another example, the traffic monitoring system(s) may use reference markings indicative of the road segment elements (e.g. stop lines, lane separators, etc.) to accurately identify them in particular with respect to dynamic objects detected in the road segment.

Figure 10:
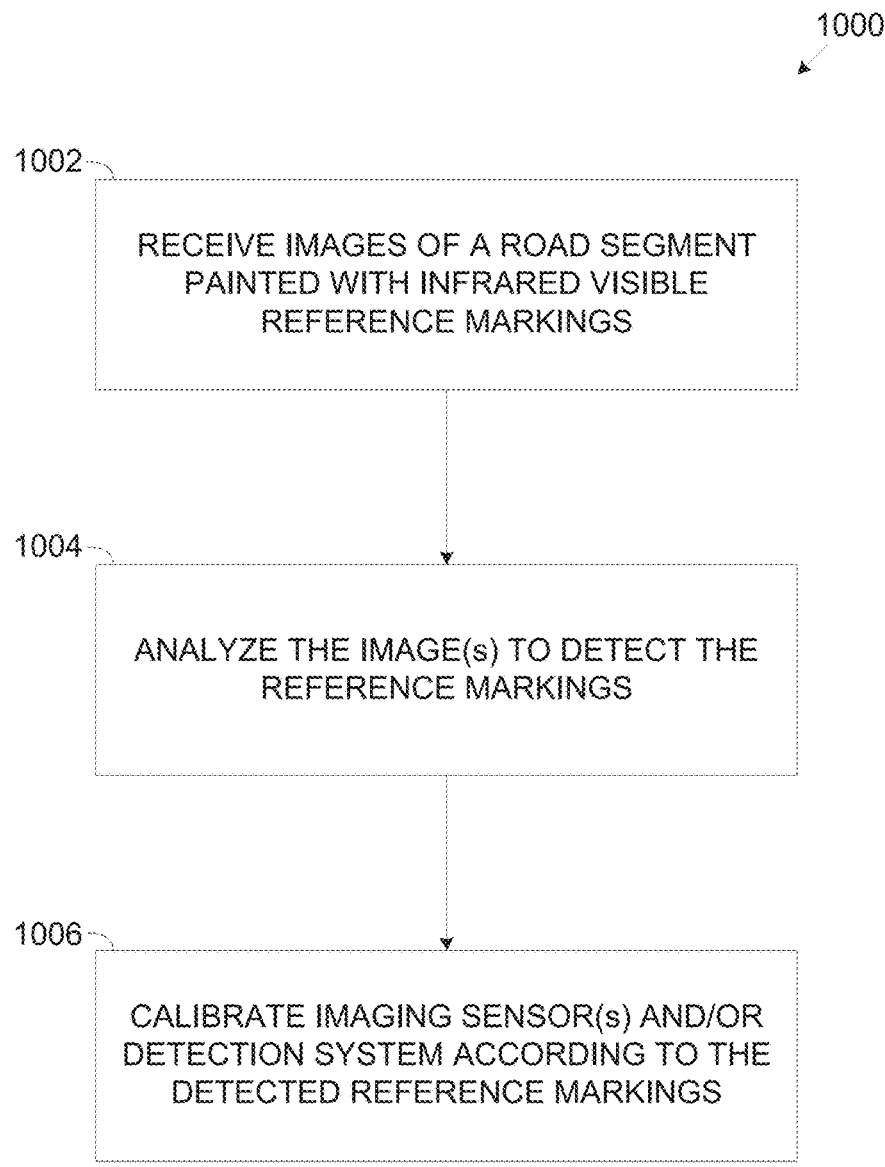
FIG. 10 is an exemplary process of calibration based on road reference markings painted using paint material(s) visible in the infrared spectrum while imperceptible in the visible light spectrum, according to some embodiments of the present invention.

Reference is now made to FIG. 10, which is an exemplary process of calibration based on road reference markings painted using paint material(s) visible in the infrared spectrum while imperceptible in the visible light spectrum, according to some embodiments of the present invention.

An object detection system such as the object detection system 900, specifically an object detection system 900 used by one or more traffic monitoring systems deployed to monitor a road segment may be configured to execute a detection engine such as the detection engine 920 for executing an exemplary process 1000. The detection engine 920 may execute the process 1000 to calibrate the object detection system 900, the detection engine 920 and/or one or more imaging sensors such as the imaging sensor 902 deployed to monitor the road segment according to road reference markings painted in the road segment which are highly visible in the infrared spectral range(s) while highly imperceptible in the visible light spectral range.

As shown at 1002, the object detection system 900, specifically the detection engine 920 may receive one or more images of the road segment captured by the imaging sensor(s) 902.

As the imaging sensor(s) 902 may be configured to operate in one or more of the infrared spectral ranges, for example, NIR, SWIR and/or the like, the images depicting the road segment may further depict one or more reference markings painted on one or more surfaces of the road segment using one or more pant materials which reflect visible light deviating by less than the first (e.g. 15%, 20%, 25%, etc.) from the visible light spectral range reflected by the respective surface while reflecting infrared light deviating by more than the second value (e.g. 20%, 25%, 30% etc.) from the infrared light reflected by the respective surface.

As shown at 1004, the detection engine 920 may analyze the image(s) depicting at least part of the road segment to identify one or more reference markings painted in the road segment. The detection engine 920 may analyze the image(s) using one or more of the methods, techniques and/or algorithms known in the art for image analysis and object detection, for example, computer vision, image processing, classifiers, machine learning models and/or the like.

As shown at 1006, the detection engine 920 may calibrate the object detection system 900, the detection engine 920 itself and/or one or more of the imaging sensors 902 deployed to monitor the road segment.

For example, one or more of the imaging sensors 902 may be calibrated, for example, adjust their alignment, reference plane, orientation and/or the like according to one or more attributes of one or more of the reference markings, for example, location, position, orientation, dimension(s) and/or the like. For example, a certain imaging senor 902 may be calibrated according to its distance, position and/or orientation compared to one or more reference markings detected in the images. In another example, the object detection system 900, the detection engine 920 may be calibrated and/or adjusted to align according to one or more elements (e.g. stop lines, lane separators, intersection entry/exit points, etc.) of the road segment which are indicated by one or more of the reference markings identified in the images of the road segment.

In another example, the detection engine 920 may extract the identifier of the road segment encoded in one or more of the reference markings. The detection engine 920 may further access one or more data records, for example, a file, a database, a cloud service and/or the like associating road segment with respective data, for example, dimensions of the road segment, location of one or more of the road segment elements and/or the like. The data record(s) may be stored locally (e.g. in the storage 914) and/or remotely in one or more networked resources accessible via the I/O interface 910. The detection engine 920 may therefore fetch the data associated with the road segment identified by its extracted identifier and may use the fetched data to calibrate itself, the object detection system 900, the traffic monitoring system(s) and/or one or more of the imaging sensor(s) 902.

Figure 11A:
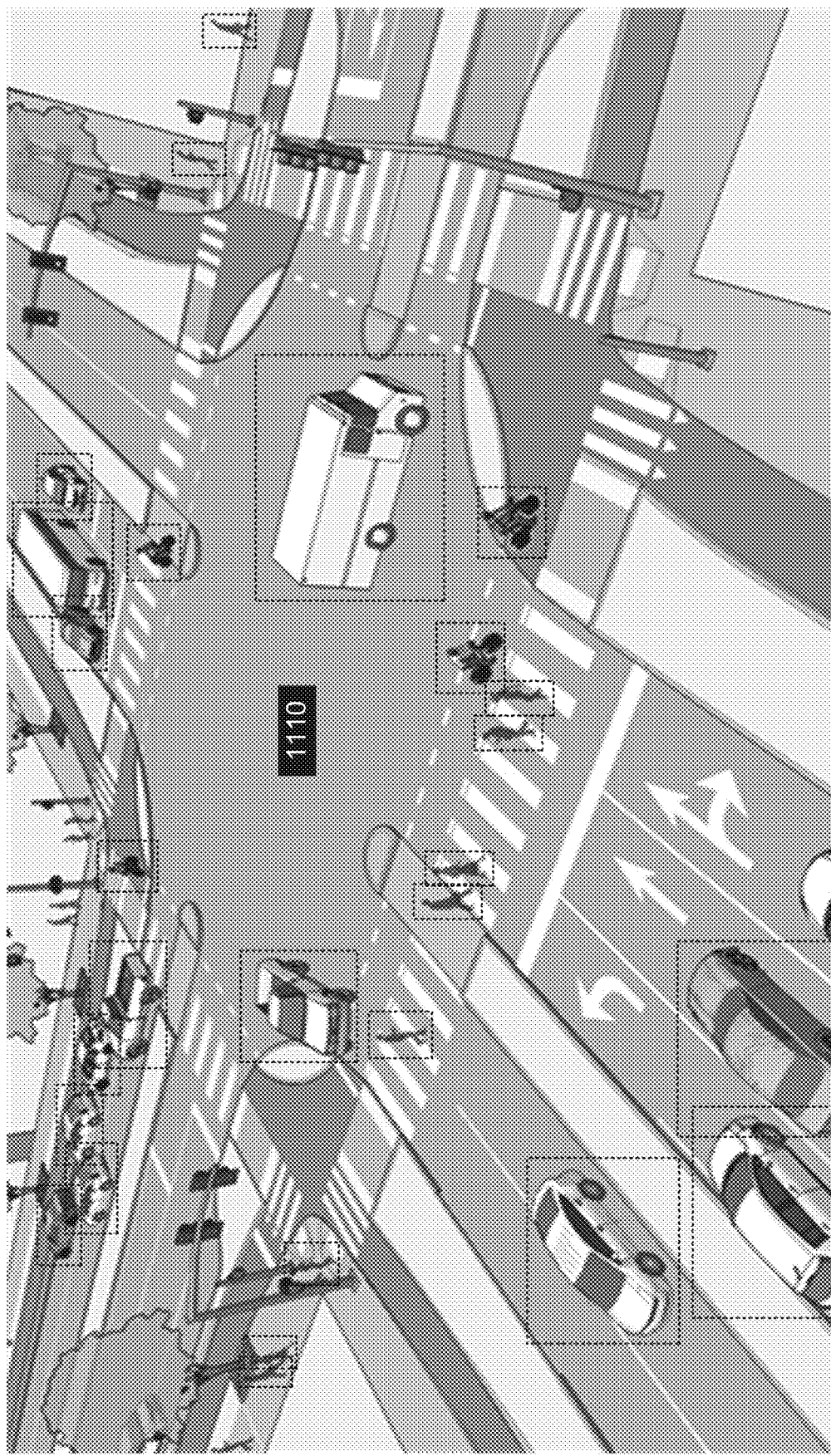
FIG. 11A and FIG. 11B present exemplary reference markings painted in an exemplary intersection using paint material(s) visible in the infrared spectrum while imperceptible in the visible light spectrum, according to some embodiments of the present invention.
Figure 11B:
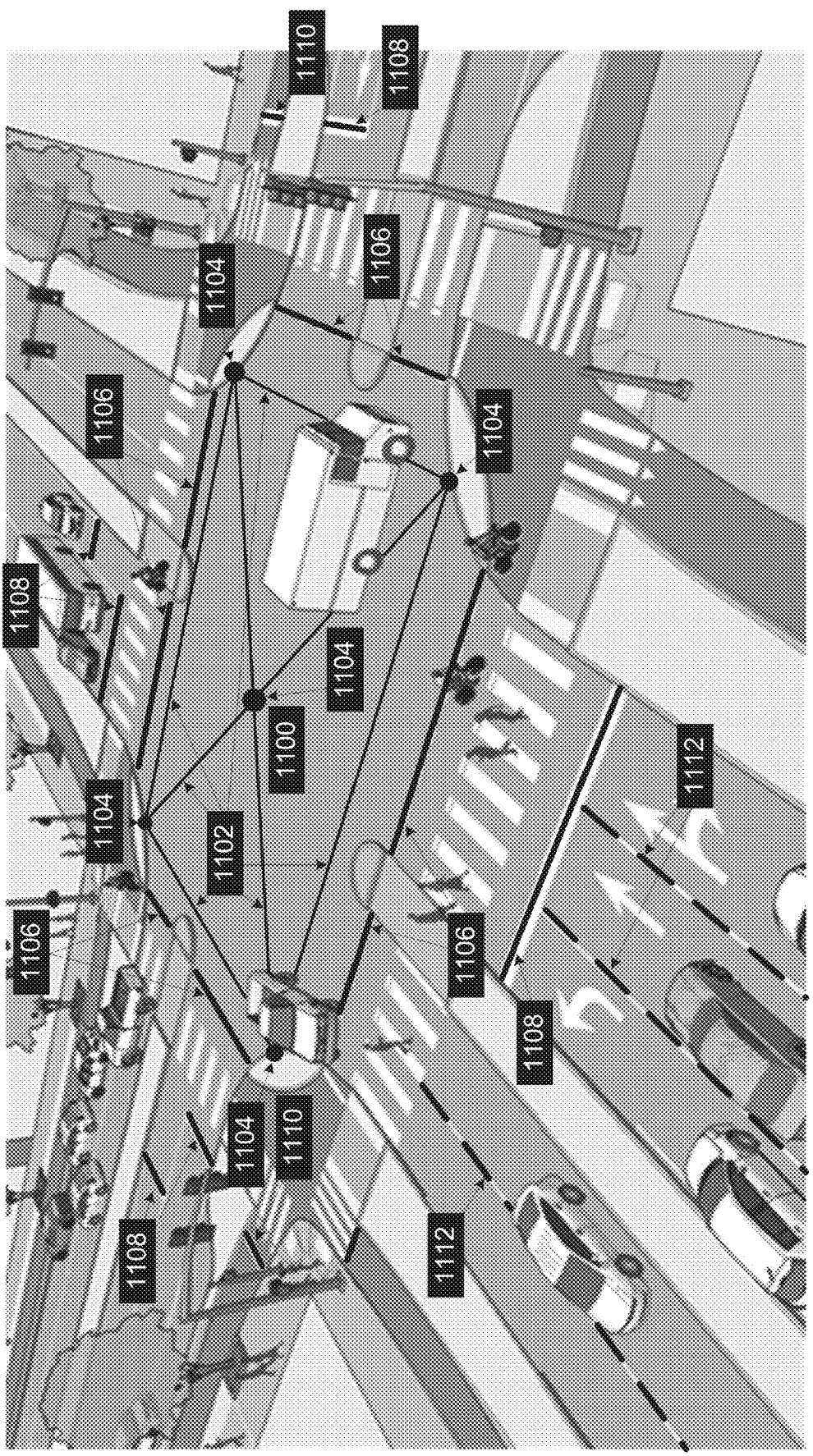

Reference is now made to FIG. 11A and FIG. 11B, which present exemplary reference markings painted in an exemplary intersection using paint material(s) visible in the infrared spectrum while imperceptible in the visible light spectrum, according to some embodiments of the present invention.

FIG. 11A and FIG. 11B present an exemplary road segment, specifically a 4-way intersection 1100 controlled by traffic lights from all directions in which a plurality of vehicles, for example, cars, truck, bicycles, buses and/or the like as well as pedestrians may travel and move around.

As seen in the image in FIG. 11A depicting the intersection 1100 in visible light range, a traffic monitoring system incorporating and/or utilizing an object detection system such as the object detection system 900 deployed to monitor traffic in the intersection 1100 may receive images from one or more imaging sensors such as the imaging sensor 902 deployed to monitor the intersection 1100.

For example, the traffic monitoring system utilizing the object detection system 900 may be configured detect, track, monitor and optionally analyze and generate reports relating to vehicle traffic, pedestrian traffic, and/or the like.

The object detection system 900 may therefore analyze images captured by the imaging sensor(s) 902 to identify one or more dynamic objects, for example, vehicles, people, bicycles and/or the like in the intersection 1100. The boxed dynamic objects may therefore indicate detected, tracked and/or monitored objects.

However, in order to effectively detect, tracked and/or monitor the dynamic objects and compute their location, position and/or the like the imaging senor(s) 902 need to be accurately calibrated. Moreover, in order to efficiently monitor the traffic (either vehicular or human), the object detection system 900 may need to detect the dynamic objects with respect to one or more infrastructure elements of the intersection 1100, for example, separator lanes, pedestrian crossings, vehicle stop lines, entry points of the intersection 100, exit points of the intersection 100 and/or the like.

To this end, one or more reference markings may be painted in the intersection 1100 as seen in FIG. 11B.

For example, calibration reference markings 1102 may be painted on the road surface across the intersection 1100. Moreover, a plurality of calibration points 1104 may be painted on the sidewalk surface and/or the road surface at key points of the intersection 1100, for example, at the four corners of the intersection 1100, in the middle of the intersection 1100 and/or the like. One or more imaging sensors 902 deployed at the intersection 1100 may capture one or more images of the intersection 1100, specifically in one or more of the infrared spectral ranges. The captured image(s) may be analyzed to identify one or more of the calibration reference markings 1102 and/or 1104 and their position. The respective imaging sensor 902 which captured the image(s) may be then calibrated according to the position, location and/or orientation of the identified calibration reference markings 1102 and/or 1104.

In another example, one or more reference markings 1106 may be painted on the road surface at each entry point and/or exit point of the intersection 1100. One or more traffic monitoring systems, for example, a red-light crossing detection system may use the reference markings 1106 to accurately identify the entry and exit points of the intersection 1100 and thus accurately detect vehicles that cross an entry point and/or an exit point during red light.

In another example, one or more reference markings 1108 may be painted on the road surface at stop lines of motorized vehicles lanes of the intersection 1100. Moreover, one or more reference markings 1110 may be painted on the road surface at stop lines of bicycle lanes entering/exiting the intersection 1100. One or more traffic monitoring systems, for example, the red-light crossing detection system may further use the reference markings 1108 and/or 1110 to accurately identify the stop lines and further accurately detect vehicles and/or bicycles that cross these stop lines during red light.

In another example, one or more reference markings 1112 may be painted on the road surface over lane separator lines of lanes going in and out of the intersection 1100. One or more traffic monitoring systems, for example, an accident analysis system may further use the reference markings 1112 to accurately identify the lane separators and in particular, detect position, location, speed and/or the like of one or more vehicles, bicycles and/or pedestrians with respect to lane separator lines.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms infrared reflective, absorptive and/or at least partially infrared—transparent paint materials and imaging sensor are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of detecting dynamic objects using road painted patterns perceptible in infrared spectral range, comprising:
using at least one processor for:
receiving at least one infrared image depicting, in at least one infrared spectral range, at least one surface of at least one road segment painted with at least one background pattern using at least one paint material characterized by: (1) reflecting light in visible light spectral range deviating less than a first value from the light reflected by the at least one surface, and (2) reflecting light in the at least one infrared spectral range deviating more than a second value from the light reflected by the at least one surface;

analyzing the at least one infrared image to detecting at least one dynamic object located in front of the at least one background pattern, the light reflected by the at least one dynamic object in the infrared spectral range deviating from the light reflected by the at least one background pattern; and computing a location of the at least one identified object.

2. The method of claim 1, wherein the at least one dynamic object is a member of a group consisting of: a vehicle and a pedestrian.

3. The method of claim 1, wherein the first value equals 20% and the second value equals 25%.

4. The method of claim 1, wherein the at least one infrared spectral range is a member of a group consisting of: near infrared (NIR) having a wavelength in a range of 750-1400 nanometer, and short wave infrared (SWIR) having a wavelength in a range of 1400-3000 nanometer.

5. The method of claim 1, further comprising a plurality of background patterns are painted on the at least one surface suing a plurality of paint material such as the at least one paint material which are further characterized by reflecting light in the at least one infrared spectral range deviating from each other by more than a third value, the third value equals 25%.

6. The method of claim 1, further comprising the second value of the at least one paint material characterizes the at least one paint material to transfer more than a fourth value of light in the infrared spectral range thus exposing the at least one background pattern painted beneath the at least one paint material, the fourth value equals 85%.

7. The method of claim 1, further comprising analyzing the at least one image to compute at least one attribute of the at least one identified object, the at least one attribute is a member of a group consisting of: a size, a length, a width, a height, a speed, an acceleration and a movement direction.

8. The method of claim 1, wherein the at least one surface on which the at least one background pattern is painted comprises at least one member of a group consisting of: a road surface, a sidewalk surface and a transportation infrastructure object surface.

9. The method of claim 1, wherein the at least one background pattern is applied over the at least one surface which is already painted with at least one paint material perceptible in the visible light range.

10. The method of claim 1, wherein the at least one background pattern is painted according to instructions computed automatically based on at least one image of the at least one road segment.

11. A method of calibrating imaging sensors deployed to monitor roads traffic according to infrared visible reference markings, comprising:

using at least one processor for:

receiving at least one at least one infrared image captured by at least one imaging sensor depicting, in at least one infrared spectral range, at least one surface of at least one road segment painted with at least one reference markings using at least one paint material characterized by: (1) reflecting light in visible light spectral range deviating less than a first value from the light reflected by the at least one surface, and (2) reflecting light in at least one infrared spectral range deviating more than a second value from the light reflected by the at least one surface;

analyzing the at least one infrared image to determine a position of the at least one reference markings; and calibrating the at least one imaging sensor according to the computed position of the at least one reference markings.

12. The method of claim 11, wherein the at least one reference markings further comprising an identifier of the at least one road segment.

13. The method of claim 11, wherein the first value equals 20% and the second value equals 25%.

14. The method of claim 11, wherein the at least one infrared spectral range is a member of a group consisting of near infrared (NIR) having a wavelength in a range of 750-1400 nanometer, and short wave infrared (SWIR) having a wavelength in a range of 1400-3000 nanometer.

15. The method of claim 11, further comprising the second value of the at least one paint material characterizes the at least one paint material to transfer more than a fourth value of light in the infrared spectral range thus exposing the at least one reference markings painted beneath the at least one paint material, the fourth value equals 85%.

16. The method of claim 11, wherein the surface on which the at least one reference markings are painted comprises at least one member of a group consisting of: a road surface, a sidewalk surface and a transportation infrastructure object surface.

17. The method of claim 11, wherein the at least one reference markings are applied over the at least one surface which is already painted with at least one paint material perceptible in the visible light range.

18. The method of claim 11, wherein the at least one reference markings is painted according to instructions computed automatically based on at least one image of the at least one road segment.

* * * * *